(12) United States Patent
Harrington et al.

(10) Patent No.: US 8,013,069 B2
(45) Date of Patent: Sep. 6, 2011

(54) POLYMER BLENDS AND PELLETS AND METHODS OF PRODUCING SAME

(75) Inventors: Bruce Allan Harrington, Houston, TX (US); Michael Glenn Williams, Humble, TX (US); Sudhin Datta, Houston, TX (US); Srivatsan Srinivas Iyer, Pearland, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 1638 days.

(21) Appl. No.: 11/332,024

(22) Filed: Jan. 13, 2006

(65) Prior Publication Data

US 2006/0183861 A1 Aug. 17, 2006

Related U.S. Application Data

(60) Provisional application No. 60/648,968, filed on Jan. 31, 2005.

(51) Int. Cl.
*C08L 23/12* (2006.01)

(52) U.S. Cl. ......................................... 525/191; 525/240

(58) Field of Classification Search .................. 525/191, 525/240
See application file for complete search history.

(56) References Cited

U.S. PATENT DOCUMENTS

| | | | |
|---|---|---|---|
| 3,629,212 A | 12/1971 | Benedikter et al. | 260/80.78 |
| 4,016,342 A | 4/1977 | Wagensommer | 526/65 |
| 4,306,041 A | 12/1981 | Cozewith et al. | 526/65 |
| 5,539,056 A | 7/1996 | Yang et al. | 525/240 |
| 5,844,045 A | 12/1998 | Kolthammer et al. | 525/240 |
| 6,207,756 B1 * | 3/2001 | Datta et al. | 525/191 |
| 6,221,982 B1 | 4/2001 | Debras et al. | 526/64 |
| 6,291,601 B1 | 9/2001 | Debras | 526/64 |
| 6,319,998 B1 | 11/2001 | Cozewith et al. | 526/65 |
| 6,326,442 B1 | 12/2001 | Koveal et al. | 526/64 |
| 6,458,900 B1 | 10/2002 | Aittamaa et al. | 526/71 |
| 6,525,157 B2 | 2/2003 | Cozewith et al. | 526/348 |
| 6,545,088 B1 | 4/2003 | Kolthammer et al. | 525/53 |
| 6,635,715 B1 * | 10/2003 | Cozewith et al. | 525/240 |
| 6,642,316 B1 * | 11/2003 | Datta et al. | 525/240 |
| 6,770,714 B2 * | 8/2004 | Ommundsen et al. | 525/191 |
| 2003/0088021 A1 | 5/2003 | Van Dun et al. | 525/53 |
| 2003/0204017 A1 | 10/2003 | Stevens et al. | |
| 2004/0024146 A1 | 2/2004 | Friedersdorf | 526/82 |

FOREIGN PATENT DOCUMENTS

| | | |
|---|---|---|
| EP | 0 887 380 | 12/1998 |
| EP | 0 910 593 | 4/1999 |
| EP | 1 059 309 | 12/2000 |
| EP | 1 060 202 | 12/2000 |
| WO | WO 96/33227 | 10/1996 |
| WO | WO 97/22639 | 6/1997 |
| WO | WO 97/40080 | 10/1997 |
| WO | WO 97/44391 | 11/1997 |
| WO | WO 98/02471 | 1/1998 |
| WO | WO 02/083754 | 10/2002 |
| WO | WO 2004/014998 | 2/2004 |

OTHER PUBLICATIONS

60/519,975, "Semicrystalline Propylene Polymers and Uses Thereof", 2003B121, filed on Nov. 14, 2003.
J. C. Lynch et al., "The Effect of Interfacial Adhesion on the Izod Impact Strength of Isotactic Polypropylene and Ethylene-Propylene Copolymer Blends," Polymeric Materials Science and Engineering, vol. 71, Fall Meeting 1994, Washington, D.C., pp. 609-610.
E. B. Nauman et al., "Compositional Quenching: A Process For Forming Polymer-In-Polymer Microdispersions and Cocontinuous Networks," Chem. Eng. Comm. 1988, vol. 66, pp. 29-55.

\* cited by examiner

*Primary Examiner* — Leszek Kiliman
(74) *Attorney, Agent, or Firm* — Kevin M. Faulkner

(57) ABSTRACT

Blends of at least two polymers incorporating propylene-derived units and processes for producing such blends are provided. The first polymer of the blend is a low crystallinity polymer including propylene-derived units. The second polymer is a high crystallinity polymer including propylene-derived units. The polymer blends exhibit the beneficial performance characteristics of low crystallinity propylene polymers while minimizing certain processing and handling problems associated with low crystallinity propylene polymers. Low crystallinity propylene polymer pellets often exhibit a tendency to agglomerate because of the softness of such particles. Agglomeration of the pellets creates problems in handling and processing the particles. The polymer blends disclosed reduce the tendency of polymer pellets to agglomerate while maintaining the desirable physical properties, such as elastomeric properties, exhibited by low crystallinity propylene polymers. Various processes for producing the polymer blends are also provided.

23 Claims, 9 Drawing Sheets

FIG. 5B Comparative Physical Blend, annealed

FIG. 5D Parallel Reactor Blend / annealed

FIG. 5A Comparative Physical Blend, not annealed

FIG. 5C Series Reactor Blend / annealed

Stress-Strain Curves for representative examples of the reactor blends and comparative examples of the physical blends.

US 8,013,069 B2

POLYMER BLENDS AND PELLETS AND METHODS OF PRODUCING SAME

CROSS REFERENCE TO RELATED APPLICATION

This application claims the benefit of Provisional Application No. 60/648,968 filed Jan. 31, 2005, the disclosure of which is incorporated by reference.

FIELD OF THE DISCLOSURE

This disclosure relates to blends of polymers comprising propylene-derived units, processes for producing such polymer blends, and pellets made from such polymer blends.

BACKGROUND INFORMATION

It is known that one skilled in the art can blend two or more polymeric materials to achieve beneficial performance characteristics in the resulting polymeric composition. One such conventional blending process is the blending of elastomeric and thermoplastic polymeric materials. For example, U.S. Pat. No. 6,642,316 to Datta, et al. discloses blending ethylene propylene based interpolymers with polypropylene so as to provide a polypropylene dispersed phase and an elastomeric continuous matrix phase. The overall blend may be elastomeric in nature. The ethylene propylene based interpolymers may be of the type described in U.S. Pat. No. 6,525,157 to Cozewith, et al.

Various methods of producing polymeric blends are known. U.S. Pat. No. 6,207,756 to Datta, et al. describes a process for producing a blend of a dispersed phase of a semi-crystalline plastic and a continuous phase of an amorphous elastomer. The blends are produced in series reactors by producing a first polymer component in a first reactor and directing an effluent of the first reactor to a second reactor and producing the second polymer component in solution in the second reactor in the presence of the first polymeric component. U.S. Pat. No. 6,319,998 to Cozewith, et al. also discloses using series solution polymerizations to produce polymer blends. The polymer components of the blends are ethylene copolymers. U.S. Pat. No. 6,770,714 to Ommundsen, et al. discloses the use of parallel polymerizations to produce different polymeric components that are then blended through extrusion of solid finished products or using other conventional mixing equipment. One polymeric component is a propylene homopolymer or copolymer and the second polymeric component is an ethylene copolymer.

U.S. Pat. No. 6,635,715 to Datta, et al. discloses the production of physical polymer blends through blending a first polymer component that is a propylene homopolymer or copolymer and second polymer component that is propylene-alpha olefin copolymer including 5 wt. % to 25 wt. % of the alpha olefin. The polymeric components are blended by mechanical means such as melt pressing.

SUMMARY OF THE DISCLOSURE

This disclosure relates to blends of at least two polymers incorporating propylene-derived units, processes for producing such blends, and polymer pellets incorporating the blends. A first polymer of the blend is a low crystallinity polymer while a second polymer of the blend is a high crystallinity polymer. The level of crystallinity is generally reflected in the heat of fusion as measured by DSC or by the hardness as measured by Shore A. The amount of the second polymer component is generally maintained at a level so that the overall blend retains a substantial part of the elastomeric properties of the low crystallinity polymer. The polymer blends exhibit the beneficial performance characteristics of low crystallinity propylene polymers while minimizing certain processing and handling problems associated with low crystallinity propylene polymers.

The low crystallinity polymer incorporates at least 75 wt. % of propylene-derived units wherein the propylene-derived units have an isotactic triad fraction of about 65% to about 99% and a heat of fusion as measured by DSC of less than 75 J/g. The high crystallinity polymers incorporate at least 90 wt. % propylene-derived units and have a melt temperature of at least 100° C.

The polymer blends are produced in an integrated manner, in series and/or parallel solution phase polymerizations.

The resulting polymer blends retain the softness of the first polymer component while exhibiting more rapid hardening and crystallization after production. In particular, pelletization of the polymer blends through conventional finishing techniques provides pellets that attain a high degree of crystallization within a relatively short period of time, upon cooling of the pellets, as compared to pellets produced from the first polymer alone. Pellets produced from the polymer blends exhibit reduced storage and handling problems associated with low crystallinity propylene polymers.

DETAILED DISCLOSURE

Figure 1:
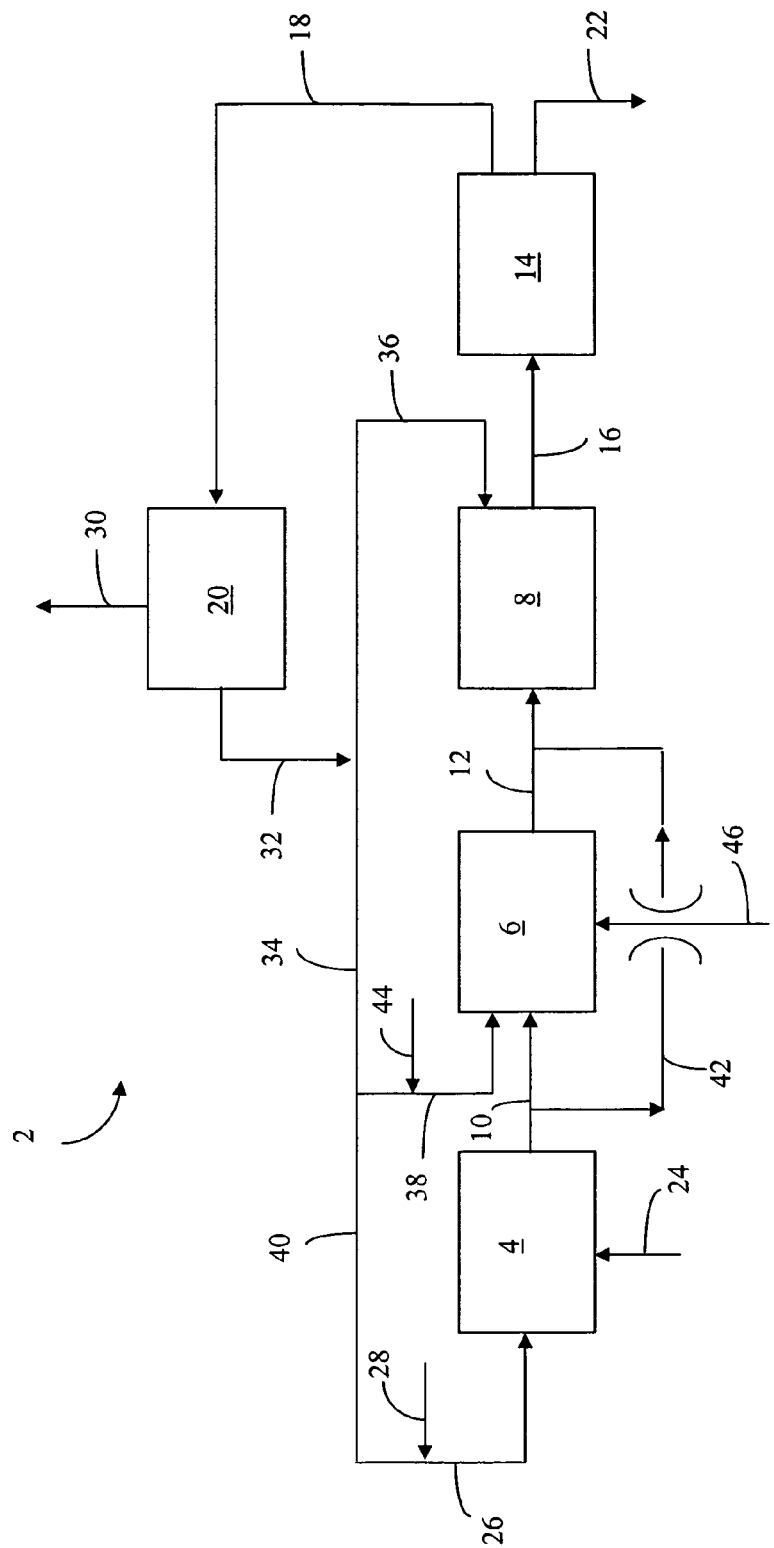
FIG. 1 is a schematic representation of exemplary systems for producing the low crystallinity polymers and high crystallinity polymers described herein.

This disclosure relates to blends of at least two polymers that exhibit beneficial performance characteristics. At least one of the polymers of the blend is a low crystallinity polymer incorporating propylene-derived units. Such polymers may be produced by copolymerizing propylene with other alpha-olefins such as ethylene, butene, hexene, and higher alpha olefins. However, it is possible to produce such polymers that are propylene homopolymers through controlled disruption of the crystallinity of the polymer backbone through the use of certain catalyst systems and polymerization conditions.

For purposes of this disclosure, a polymer including propylene-derived units and exhibiting low crystallinity shall mean a polymer incorporating at least 75 wt. % of propylene-derived units wherein the propylene-derived units have an isotactic triad fraction of about 65% to about 99% and wherein the polymer has a heat of fusion of less than 75 J/g. The heat of fusion and isotactic triad fraction of a polymer, as well as methods for determination of each, are described in WO 2002/083754 A1, which is incorporated by reference herein in its entirety. Particles made from polymers of this type are generally soft to the touch and may be tacky. While these properties are desirable for many end-use applications, the polymers present storage and handling problems. For example, polymer particles, commonly referred to in the industry as pellets, made from these polymers have a tendency to agglomerate (or exhibit restricted flow), particularly after long-term warehouse storage at ambient temperatures.

It has been discovered that agglomeration of these pellets results from deformation of the polymer pellets during storage and handling of the pellets during the first few hours or days following production of the pellets. Specifically, upon production, polymer pellets generally have shapes that are spherical, cylindrical, disk-like, or other shapes in which the outer surface of the pellets are curved as opposed to flat surfaces. Generally, polymer pellets are free-flowing as the curved surfaces of the pellets have minimal contact surface and thus slide freely past each other. However, it has been discovered that under certain circumstances, the curved pellet surfaces may become flattened during storage as a result of the pellets pressing against each other, especially when stored in containers with significant vertical dimensions. When this flattening of the surfaces of the polymer pellets occurs, contact area increases significantly, reducing the ability of the pellet surfaces to slide past each other, leading to agglomeration or restricted flow of the particles in subsequent processing steps.

By increasing the rate of crystallization, flattening of the surfaces of the pellets is less likely to occur and the pellets can become hard in the course of conventional polymer finishing steps to provide free-flowing pellets, even after the pellets are stored for long periods of time at high ambient temperatures.

The resistance of a pellet to flattening of its surfaces is related to the level of crystallization of the polymers and may be determined by measuring the hardness of the polymer pellets. Generally, it has been determined, in one embodiment, that a Shore A Hardness (ASTM 2240) of at least 50 provides pellets with a reduced tendency to agglomerate. In another embodiment, a Shore A Hardness of at least 60 provides pellets with a reduced tendency to agglomerate. In a third embodiment, a shore A Hardness of at least 65 provides pellets with a reduced tendency to agglomerate. While pellets made from many low crystallinity polymers may achieve this level of hardness following production, it may take days before this level of hardness is attained as the pellets crystallize slowly over time, particularly for propylene-based polymers and copolymers where crystallization kinetics are known to be slower and ethylene-based polymers and copolymers. The processes described herein speed the rate of crystallization of the polymer pellets to provide a hardness, in a short period of time after production, which enables the pellets to flow freely, even after long storage periods.

In certain embodiments of the processes and blends described herein, a first polymer having low crystallinity is blended with a second polymer to produce a polymer blend that, when processed into pellet forms, will achieve a state of crystallization sufficient to provide a Shore A hardness of at least 50, more preferably at least 52, more preferably at least 55, more preferably at least 57, more preferably at least 60 or 65, in a relatively short period time (i.e., within 40 minutes after initial cooling of the pellets, more preferably within 30 minutes, more preferably within 20 minutes, more preferable within 15 minutes, more preferably within 10 minutes and more preferably within 5 minutes), as compared to pellets produced from the low crystallinity first polymer alone. In one embodiment, the Shore A hardness is from 50 to 120 or 55 to 120. Without being bound by theory, it is believed that the blend of components function to accelerate crystallization of the low crystallinity polymer to help reach the requisite Shore A hardness. Also, rapid crystallization of the high crystallinity polymer helps achieve the requisite Shore A hardness.

It has been discovered that the agglomeration tendencies of pellets made from low crystallinity polymers may be reduced or eliminated by blending the low crystallinity polymer with at least one high crystallinity polymer incorporating propylene-derived units having high crystallinity. For purposes of this disclosure, a high crystallinity polymer incorporating propylene-derived units means a polymer incorporating at least 90 wt. % of propylene derived units and a melt temperature of at least 100° C.

In certain embodiments, the polymeric blends are formed into polymer pellets. In other embodiments, the polymer pellets are dusted with an anti-stick agent to produce polymer pellets exhibiting unique performance properties not previously seen with polymer pellets produced from polymer composition blends.

In certain embodiments of the processes and blends described herein, solutions of the low crystallinity polymer and the high crystallinity polymer are blended in conjunction with producing the polymers in separate series or parallel polymerization stages. For example, the low crystallinity polymer may be produced in a first reactor. An effluent from the first reactor, containing a solution of the low crystallinity polymer is transferred to a second reactor where a catalyst and monomers necessary to produce the high crystallinity polymer are contacted, so that a solution of the high crystallinity polymer is produced in the presence of the low crystallinity polymer. This is referred to as a series reactor process.

Both the low crystallinity polymer and the high crystallinity polymer may be produced in solution polymerization reactors. Combining the solutions of the polymeric components resulting from these processes provides an intimate blending of the low crystallinity and high crystallinity polymers during polymerization of the high crystallinity copolymer. The blended polymers are then withdrawn from the second reactor and processed into polymer particles using conventional processing equipment and techniques.

Alternatively, the high crystallinity polymer may be produced in the first reactor in series with the second reactor. Effluent from the first reactor, containing a solution of the high crystallinity polymer, is then be transferred to the second reactor where the low crystallinity polymer is produced in the presence of the high crystallinity polymer followed by processing the resultant blended polymers into polymer pellets.

In parallel polymerization processes, the low crystallinity polymer and the high crystallinity polymer are produced in parallel reactors with effluents from each reactor, containing solutions of the respective polymer, directed to a device for blending the effluents to produce a solution of blended polymer components. The blended polymers are then recovered from the solution and processed into polymer particles in accordance with conventional process equipment and techniques.

FIG. 1 provides a detailed schematic representation of exemplary systems for producing the low crystallinity polymers and high crystallinity polymers described herein. FIG. 1 provides a flow diagram illustrating certain processes and systems described herein, including systems alternating between series reactor flow and parallel reactor flow, as well as variable recycle. Each box in the flow diagram represents apparatus or equipment, which can be conventional and need not be described in detail. Each of the lines connecting the boxes represents streams or flow of material, it being understood that streams can be directed through any of a variety of types of conduits, e.g., pipes, which may have intervening equipment (not shown) such as but not limited to standard connections, valves and pumps. U.S. Published Application 20040024146 A1 provides additional detail relating to reactors and other components depicted in FIG. 1.

An overall system 2 includes a first solution phase reactor 4 in which polymerization of a first polymeric component takes place. A second polymeric component is produced in a second solution phase reactor 6. Phase separator 8 receives the polymer solution output of one or both of the reactors 4 and 6 (e.g., effluent streams 10 and/or 12). Devolatizer 14 removes volatile components from the output 16 of the phase separator 8. A stream 18 containing monomers and solvents removed from the polymer solutions in devolatizer 14 is directed to fractionator 20 designed to separate monomers and solvents. A polymer product stream 22 is removed from devolatizer 14.

The polymerizations occurring in reactors 4 and 6 may be practiced as series polymerizations or parallel polymerizations. Referring to FIG. 1, a first catalyst can be introduced to the polymerization zone of the first reactor 4 via stream 24, typically as part of a catalyst mixture, described elsewhere herein. Monomers can be introduced to polymerization zone of reactor 4 via stream 26. Fresh monomers can be introduced via stream 28. A first polymeric component is produced in polymerization zone of reactor 4. When a series configuration is utilized, the effluent from the first reactor 4 including the first polymeric component is directed via stream 10 to the polymerization zone of the second reactor 6, where a second polymerization is conducted to produce a second polymeric component. The effluent 12 from the second reactor 6, including the first and second polymeric components, is directed via stream 12 is directed to phase separator 8 where it is processed in a separation process, e.g., liquid-liquid phase separation, to separate a polymer-rich component from a non-polymeric component. The non-polymeric component includes solvent, unreacted monomers and catalyst. The polymer-rich component includes primarily the polymer blend composition described herein which can be described as a blend of the low crystallinity polymer component and the high crystallinity polymer component. However, the polymer-rich component also includes materials such as unreacted monomers not successfully removed in the liquid-liquid separator. Accordingly, the polymer-rich component is fed via stream 16 to a devolatizer 14 that removes a vapor stream 18 and a liquid polymer product stream 22, which has a higher concentration of polymer than the polymer stream 16. The vapor stream 18, that includes unreacted monomers and solvent, is directed to a fractionator 20, from which monomers and solvent can either be discharged via stream 30 or reintroduced via stream 32 to the recycle stream 34. Fractionator 20 can include one or more fractionators by which vaporized monomers such as ethylene, propylene and/or dienes can be removed, separately or in combination. Fractionator 20 may also include a condenser that converts the vapor contents of stream 18 to liquid. Liquid output stream 32 may include solvent, and in certain cases monomers. Stream 32 can be introduced to the liquid recycle stream 36, or 34, the composition of which can be adjusted as desired, based on the extent or amount of monomers being reintroduced, to provide recycle stream 34. Recycle stream 34 may be fed via stream 38 back to the polymerization zone of the second reactor 6, and additional monomers, e.g., ethylene, other olefins, or dienes, can be added to the input stream 38 via stream 44. Recycle stream 40 can be fed via stream 26 back to the polymerization zone of the first reactor 4, and additional monomers, e.g., propylene or ethylene, other olefins, or dienes, can be added via stream 28 to the input stream 26. In addition, scavengers can be used and added to stream 28 or 44, as desired.

As noted above, the processes and systems depicted in FIG. 1 may be practiced as parallel polymerizations. Moreover, the system configuration depicted in FIG. 1 provides the ability to alternate between the series approach, discussed above, and parallel polymerizations, which will now be discussed. With a parallel polymerization approach, the effluent stream 10 leaving the polymerization zone of the first reactor 4 bypasses the second polymerization zone of the second reactor 6 via bypass stream 42. Meanwhile, monomers are fed to the polymerization zone of the second reactor 6 via input stream 38 which can include fresh monomers, scavengers, or solvent, or via stream 44 and/or monomers may be added as part of recycle stream 34. In the parallel system configuration operation, no first polymeric component is introduced to the second polymerization zone of the second reactor 6, but rather only monomers, solvent and catalyst are added via streams 38 and 46. The second polymeric component is formed in the polymerization zone of the second reactor, and an effluent that includes the second polymeric component, unreacted monomers, solvent and catalyst leaves the second reactor 6 via stream 12, and is combined with the effluent from the first reactor 4, which includes the first polymeric component, either before entering the quench mixer and then the phase separator 8 as depicted in FIG. 1 or via stream 42, alternatively, after entering the phase separator 8 (not shown). As discussed above, the combined effluent includes the polymer composition that comprises the low crystallinity polymer component and the high crystallinity polymer component.

In embodiments in which the low crystallinity polymer component is produced in the first polymerization stage, it is generally desirable to convert as much of any comonomer added to the first polymerization stage as possible. Conversion of the comonomer is facilitated by higher catalyst flows. Hydrogen flow and temperature may be used to control molecular weight. Generally, a comonomer content in the effluent transferred from the first polymerization stage to the second polymerization stage of 2 wt. % or less is desirable to avoid an undesirably high comonomer content in the high crystallinity polymer produced in the second polymerization stage.

In embodiments in which the high crystallinity polymer is produced in the first polymerization stage, since a low comonomer content is the high crystallinity polymer is generally desirable, additional comonomer is generally added to the second polymerization stage to produce the desired low crystallinity polymer in the second polymerization stage. Steps may have to be taken to reduce the comonomer content in the recycle stream to produce the desired high crystalline component, or steps may be taken to remove ethylene all together from the recycle stream to make it possible to make isotactic polypropylene (iPP) as the high crystallinity polymer component (HCPC).

In embodiments that involve parallel reactor configuration the HCPC can be made in either reactor. Two reactors have independent temperature, pressure, and feed controls such that product blend properties can be tailored independently.

Low Crystallinity Polymer Component ("LCPC")

The following is a description of low crystallinity polymer components suitable for use in the polymer blends that may be produced in the processes described herein.

The LCPC has crystalline regions interrupted by non-crystalline regions. The non-crystalline regions may result from regions of non-crystallizable polypropylene segments and/or the inclusion of comonomer units. The crystallinity and the melting point of the LCPC are reduced compared to highly isotactic polypropylene by the introduction of errors in the insertion of propylene and/or by the presence of comonomer. In one embodiment, the LCPC incorporates from about 11 wt. % to 16 wt. % of the ethylene-derived units.

In one embodiment, the LCPC comprises at least 75 wt. % of propylene-derived units. In another embodiment, the LCPC comprises from 75 wt. % to 95 wt. % of propylene-derived units. In still another embodiment, the LCPC comprises from 80 wt. % to 90 wt. % of propylene-derived units.

In one embodiment, the LCPC has a Shore A hardness of less than about 90. In another embodiment, the LCPC has a Shore A hardness of about 45 to about 90. In still another embodiment, the LCPC has a Shore A hardness of about 50 to about 75.

In one embodiment, the LCPC has a melt flow rate (MFR) of about 0.5 to about 200. In another embodiment, the LCPC has an MFR of about 1 to about 100. In still another embodiment, the LCPC has an MFR of about 1 to about 50.

The crystallinity of the LCPC may be expressed in terms of heat of fusion. In certain embodiments, the LCPC has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or less than 75 J/g. Without being bound by theory, it is believed that the LCPC described herein has generally isotactic crystallizable propylene sequences, and the heats of fusion described above are thought to result from melting of these crystalline segments. In one embodiment, the LCPC has a heat of fusion of less than 60 J/g. In one embodiment, the level of crystallinity of the LCPC is also reflected in a lower melting point.

In one embodiment, the LCPC has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 1.9.

In one embodiment, the propylene-derived units of the LCPC have a peak melt temperature of less than 65° C. In another embodiment, the propylene-derived units of the LCPC have a peak melt temperature less than 55° C. In still another embodiment, the propylene-derived units of the LCPC have a peak melt temperature less than 50° C.

In some embodiments, the crystallinity of the LCPC is reduced by the copolymerization of propylene with limited amounts of one or more comonomers selected from: ethylene, $C_4$-$C_{20}$ alpha-olefins, and polyenes. In one embodiment, the LCPC comprises at least 5 wt. % of the alpha-olefin comonomer units. In another embodiment, the LCPC comprises about 10 wt. % to about 20 wt. % of the alpha-olefin comonomer units. In another embodiment, the LCPC comprises from about 75 wt. % to about 95 wt. % propylene-derived units and from about 5 wt. % to about 25 wt. % of the ethylene-derived units. In still another embodiment, the LCPC comprises from about 80 wt. % to about 95 wt. % propylene-derived units and from about 5 wt. % to about 20 wt. % of the ethylene-derived units. In an additional embodiment, the LCPC comprises at least 70 wt. % of propylene-derived units and about 5.0 wt. % to about 30.0 wt. % of the ethylene-derived units.

The optional polyene units may be derived from any hydrocarbon structure having at least two unsaturated bonds wherein at least one of the unsaturated bonds may be incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, alkenyl norbornenes, alkylidene norbornenes, cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, divinyl benzene, and tetracyclo (A-11,12)-5,8-dodecene.

In one embodiment, the LCPC incorporates from about 1 wt. % to about 12 wt. % of polyene-derived units, based on the combined weight of the propylene-derived units and the alpha-olefin-derived units, if any. In another embodiment, the LCPC incorporates from about 1.0 wt. % to about 9.0 wt. % of polyene-derived units, based on the combined weight of the propylene-derived units and the alpha-olefin-derived units, if any. In another embodiment, the LCPC incorporates from about 2.0 wt. % to about 7.0 wt. % of polyene-derived units, based on the combined weight of the propylene-derived units and the alpha-olefin-derived units, if any. In yet another embodiment, the LCPC incorporates from about 3.0 wt. % to about 5.0 wt. % of polyene-derived units, based on the combined weight of the propylene-derived units and the alpha-olefin-derived units, if any.

In one embodiment, the polyene-derived units are derived from 5-ethylidene-2-norbornene. In another embodiment, the polyene-derived units are derived from 5-vinyl-2-norbornene. In still another embodiment, the polyene-derived units are derived from divinyl benzene.

The polymer blends described herein are not limited by any particular polymerization method for preparing the LCPC of the invention, and the polymerization processes described herein are not limited by any particular type of reaction vessel. For example, metallocene catalyst systems may be used.

In one embodiment, the catalyst system used to produce the LCPC includes one or more transition metal compounds and one or more activators. When alumoxane or aluminum alkyl activators are used as activators, the combined pre-catalyst-to-activator molar ratio is from 1:5000 to 1:10. When ionizing activators are used, the combined pre-catalyst-to-activator molar ratio is from 10:1 to 1:10. Multiple activators may be used, including using mixtures of alumoxanes or aluminum alkyls with ionizing activators. In other embodiments, the methods and catalyst systems disclosed in U.S. Patent Application 20040024146 published Feb. 5, 2004 may be used to produce the LCPC. In still other embodiments, the LCPC may be produced using catalyst systems such as the nonmetallocene, metal-centered, heteroaryl ligand catalyst systems as described in U.S. Patent Application 20030204017 published Oct. 30, 2003.

Exemplary LCPC's are commercially available from ExxonMobil Chemical under the tradename Vistamaxx™.

For further general process condition information suitable for use in preparing the LCPC's, see U.S. Pat. No. 5,001,205 and PCT publications WO 96/33227 and WO 97/22639.

High Crystallinity Polymer Component ("HCPC")

The following is a description of high crystallinity polymer components ("HCPC's") suitable for use in the polymer blends and processes described herein.

The HCPC may be a propylene homopolymer or copolymer. The polypropylene used in the blends described herein may vary widely in form. For example, a substantially isotactic polypropylene homopolymer can be used or the polypropylene can be in the form of a random copolymer containing less than or equal to about 10 weight percent of other monomer, i.e., at least about 90% by weight propylene. In one embodiment, HCPC incorporates at least about 95% by weight propylene. Further, the polypropylene can be present in the form of a graft or block copolymer, in which the blocks of polypropylene have substantially the same stereoregularity as the propylene-alpha-olefin copolymer, so long as the graft or block copolymer has a sharp melting point characteristic of the stereoregular propylene sequences that is above about 100° C. in one embodiment, and above 110° C. in another embodiment and, in still another embodiment, above 125° C. The HCPC is predominately crystalline, i.e., it has a melting point generally greater than about 100° C. in one embodiment, greater than about 110° C. in a second embodiment, and greater than about 125° C. in a third embodiment. The propylene polymer component may be a combination of homopolypropylene, and/or random, and/or block copolymers as described herein. When the above propylene polymer component is a random copolymer, the percentage of the copolymerized alpha-olefin in the copolymer is, in general, up to about 9% by weight, preferably about 2% to about 8% by weight, most preferably about 2% to about 6% by weight. The preferred alpha-olefins contain 2 or from 4 to about 12 carbon atoms. The most preferred alpha-olefin is ethylene. One, or two or more alpha-olefins can be copolymerized with propylene.

Exemplary alpha-olefins may be selected from the group consisting of $C_4$ to $C_{12}$ olefins such as butene-1; pentene-1, 2-methylpentene-1,3-methylbutene-1,hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

Polymerization may be carried out by solution phase polymerizations using a variety of catalyst systems including metallocene catalyst systems such as 2-substituted bis-indenyl or a 2-substituted bis-indenyl complex having further substitutions on the indenyl ligand. The catalyst system used is preferably one which has a high isospecificity. Crystallinity of the HCPC can also be increased if necessary by using a catalyst different from that used for making the LCPC, particularly in the parallel reactor process where each reactor runs independently of the other.

LCPC and HCPC Proportions

In one embodiment, in neat form, the polymer blends described herein incorporate from about 45 wt % to about 98 wt %, more preferably from about 50 wt % to about 98 wt %, more preferably from about 60 wt % to about 98 wt %, more preferably about 70 wt. % to about 98 wt. % of the LCPC first component and from about 2 wt % to about 55 wt %, more preferably from about 2 wt % to about 50 wt %, more preferably from about 2 wt % to about 40 wt %, and more preferably from about 2 wt. % to about 30 wt. % of the HCPC. In another embodiment, in neat form, the polymer blends described herein incorporate from about 80 wt. % to about 95 wt. % of the LCPC and from about 5 wt. % to about 20 wt. % of the HCPC. In other embodiments, in neat form, the polymer blends described herein incorporate from about 90 wt. % to about 95 wt. % of the LCPC first component and from about 5 wt. % to about 10 wt. % of the HCPC. The polymer pellets described herein may also contain the LCPC and the HCPC in the proportions based on the combined weight of the LCPC and HCPC.

Additives

The polymer blends describe herein may include one or more additive components in addition to the polymer components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention.

It will be appreciated that other additives may be employed to enhance properties of the polymer blends. As is understood by those skilled in the art, the polymer blends may be modified to adjust the characteristics of the blend as desired.

In one embodiment, the polymer blends described herein incorporate about 1 wt. % to about 25 wt. % of a tackifier resin. In another embodiment, the polymer blends described herein incorporate about 2 wt. % to about 20 wt. % of a tackifier resin. In still another embodiment, the polymer blends described herein incorporate about 3 wt. % to about 15 wt. % of a tackifier resin.

Adding antioxidants to the polymer blends described herein may improve the long term aging. Examples of antioxidants include, but are not limited to quinolein, e.g., trimethylhydroxyquinolein (TMQ); imidazole, e.g., zincmercapto toluoyl imidazole (ZMTI); and conventional antioxidants, such as hindered phenols, lactones, and phosphites. The amount of antioxidants used may be within the range of from 0.001 to 5 phr.

The polymer blends described herein may include one or more non-functionalized plasticizers ("NFP's") where the non-functionalized plasticizer has a kinematic viscosity ("KV") of 2 cSt or more at 100° C. For purposes of this disclosure, if the NFP has a flash point of less than 100° C. it is defined to have a KV at 100° C. of less than 2 cSt. In one embodiment, the non-functionalized plasticizer is polyalphaolefin oligomers of $C_5$ to $C_{14}$ olefins having a Kinematic viscosity of 10 cSt or more at 100° C. and a viscosity index of 120 or more. In one embodiment, the non-functionalized plasticizers incorporate oligomers of $C_5$ to $C_{14}$ olefins having a viscosity index of 120 or more. In another embodiment, the non-functionalized plasticizers include oligomers of $C_6$ to $C_{14}$ olefins having viscosity index of 120 or more. In still another embodiment, the non-functionalized plasticizers include linear and/or branched paraffinic hydrocarbon compositions produced by one or more gas to liquids process having a number average molecular weight of 500 to 20,000. For additional information regarding non-functionalized plasticizers, see PCT published application WO 04/014998.

In one embodiment, the polymer blends described herein incorporate from about 1 wt. % to about 95 wt. % of one or more non-functionalized plasticizers having a kinematic viscosity ("KV") of at least 2 cSt at 100° C. In another embodiment, the polymer blends described herein incorporate from about 5 wt. % to about 85 wt. % of one or more non-functionalized plasticizers having a kinematic viscosity ("KV") of at least 2 cSt at 100° C. In still another embodiment, the polymer blends described herein incorporate from about 5 wt. % to about 75 wt. % of one or more non-functionalized plasticizers having a kinematic viscosity ("KV") of at least 2 cSt at 100° C. In one embodiment, the flashpoint of the non-functionalized plasticizers is at least 200° C. In another embodiment, the flashpoint of the non-functionalized plasticizers is at least 195° C. In still another embodiment, the flashpoint of the non-functionalized plasticizers is at least 190° C.

In one embodiment, the polymer blends described herein include about 1 wt. % to about 60 wt. % of an additive selected from the group consisting of a filler, a pigment, a coloring agent, a processing oil, a plasticizer, and mixtures thereof. In another embodiment, the polymer blends described herein include about 5 wt. % to about 50 wt. % of an additive selected from the group consisting of a filler, a pigment, a coloring agent, a processing oil, a plasticizer, and mixtures thereof. In still another embodiment, the polymer blends described herein include about 10 wt. % to about 40 wt. % of an additive selected from the group consisting of a filler, a pigment, a coloring agent, a processing oil, a plasticizer, and mixtures thereof.

Blending Polymeric Components and Additives

The polymer blends described herein may be prepared by the procedures described herein for combining solutions of the polymer blend components. The optional additives described herein may be added to the polymer blends by any technique providing a sufficient mixture of the polymeric blends and the selected additives. Generally, the first step of the process is mixing the polymeric components and optional additives using equipment such as, but not limited to a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components. A complete mixture of the polymeric components is indicated by the uniformity of the morphology of the composition. Such procedures are well known.

In embodiments in which crosslinking of the polymeric components is desired, the next step is mixing a chemical curative, such as peroxides or sulfur compounds, with the polymer blend mixture, and then fabricating the polymer blend mixture including the chemical curative into the final shape of the article and raising the temperature for an extended period of time to allow the crosslinking to take place. In another embodiment, the next step is fabricating the polymer blend mixture into the final shape of the article, and then exposing the fabricated mixture to an external curative agent, such as high energy radiation, to allow crosslinking of the LCPC.

For additional information regarding processes for preparation of polymeric blend compositions, including the crosslinking of polymeric components, see co-pending U.S. Patent Application Ser. No. 60/519,975 filed Nov. 14, 2003.

Production of Polymer Blend Pellets

For purposes of this disclosure, the term "polymer pellet" generally refers to polymer particles having a variety of shapes such as spheres, cylinders, eggs and disks. Polymer pellets are typically formed with melt extruders, often twin screw extruders, which function by melting a polymer or polymer blend and extruding it through a die where it is chopped into small pellets having the shapes described above. Generally, the sizes of such pellets in a first dimension ranges from about 2 mm to about 10 mm and from about 2 mm to about 10 mm in a second dimension. For example, in certain embodiments, the pellets may be spherical with diameters ranging from about 2 mm to about 10 mm. In other embodiments, the pellets may be disk-shaped with diameters ranging from about 2 mm to about 10 mm and thickness ranging from about 2 mm to about 10 mm. In still other embodiments, the pellets may be cylindrical with diameters from about 2 mm to about 10 mm with lengths of about 2 mm to about 10 mm. In general, pellet size is measured by the total weight of 50 pellets. The pellet weight for the polymer blends described herein range from about 1.0 to about 3.0 g/50 pellets. In other embodiments, the pellet weight ranges from about 1.2 to about 1.8 g/50 pellets.

In other embodiments, the first and second dimensions of the polymer pellets may range from about 2 mm to about 8 mm. In still other embodiments, the first and second dimensions of the polymer pellets may range from about 2 mm to about 5 mm.

Figure 2:
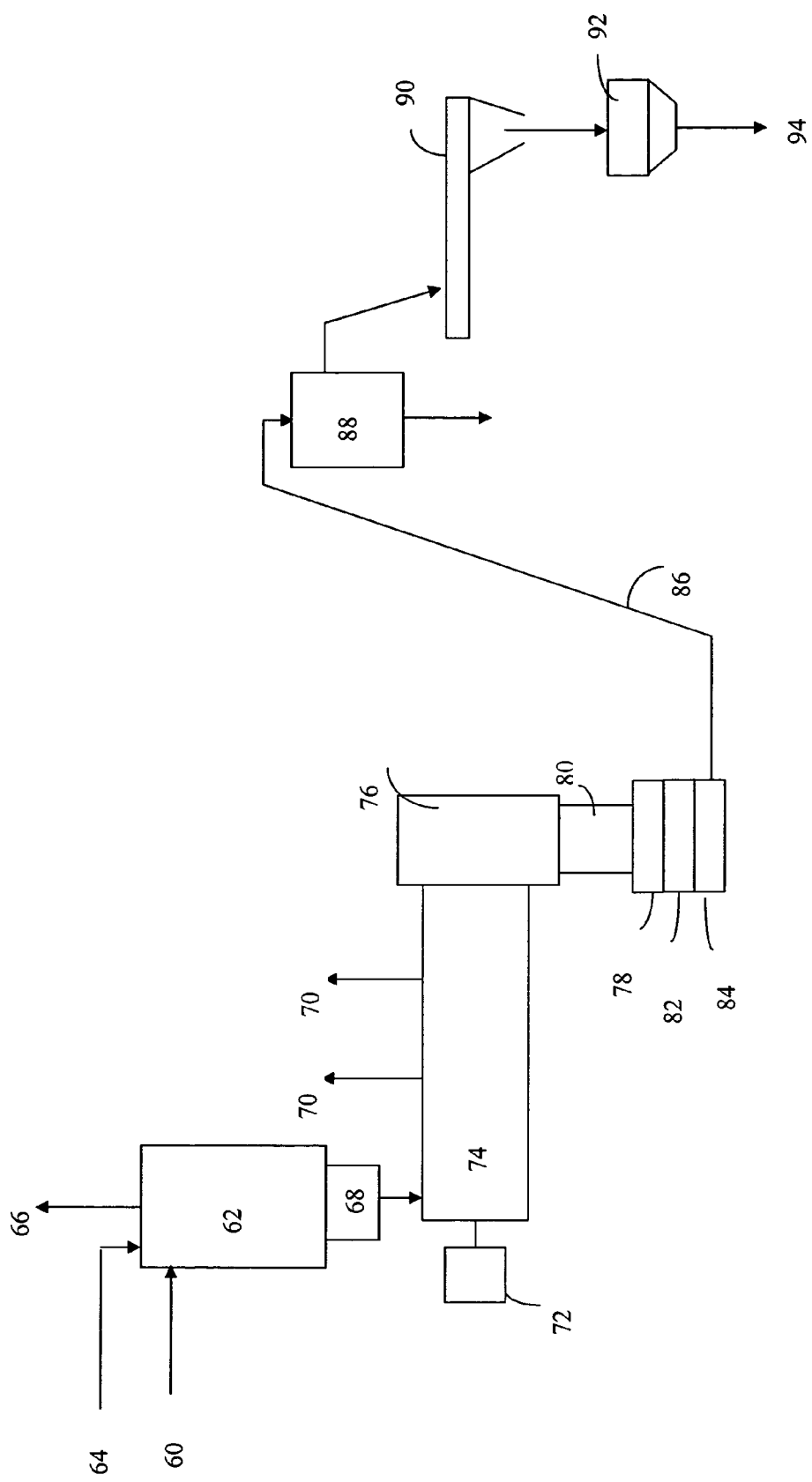
FIG. 2 a schematic representation of an exemplary system for producing pellets of the polymer blends described herein.

Pellets of the polymer blends described herein may be produced by any suitable technique for producing polymer pellets. FIG. 2 provides a schematic representation of an exemplary system for producing pellets of the polymer blends. A stream 60 of a blend of polymer solutions is added to a low-pressure separator 62 at a pressure of about 344.7 kPa to about 2,068.4 kPa. An anti-oxidant 64 is added to the low-pressure separator 62 to stabilize the hot blend 60 while non-polymeric materials such as solvent and unreacted monomers are removed through flash outlet 66. The resultant polymer blend is directed to a solvent removal apparatus, such as a vacuum solvent removal apparatus 74 such as devolatizers manufactured by LIST AG of Switzerland. Typically, vacuum applied to apparatus 74 removes non-polymeric materials such as residual solvent and unreacted monomer through vacuum hoods 70 from the molten polymer while the molten polymer is conveyed with a rotor. Suitable seals, packings and a blanket of inert gas block ingress of air through the end bearings of the rotor driven by motor 72. Oil lubricant is supplied to the sealing area.

The resulting polymer blend is removed from apparatus 74 by a screw extruder 76 and forced through a die-pack 78 by a gear pump 80. Rotating knives 82 cut the polymer strands into pellets. Chilled water (about 0° C. to about 10° C.) is supplied through inlet 84 at the pelletizer outlet to instantly chill the molten polymer exiting. The water may contain a suitable anti-coagulant such as calcium stearate, to prevent the pellets from adhering as they pass through a pipe 86 to a spin drier 88 while being quench-cooled. In one embodiment, the pellets are cooled in the water maintained at a temperature of about 0° C. to about 10° C. from 2 minutes to 60 minutes to promote sufficient crystallization of the polymer blend of the pellets to provide Shore A hardness values sufficient to reduce or prevent agglomeration in subsequent handling and storage as discussed above. In a second embodiment, the pellets are cooled in the water maintained at a temperature of about 0° C. to about 10° C. from 2 minutes to 30 minutes to promote sufficient crystallization of the polymer blend of the pellets to provide Shore A hardness values sufficient to reduce or prevent agglomeration in subsequent handling and storage as discussed above. In a third embodiment, the pellets are cooled in the water maintained at a temperature of about 0° C. to about 10° C. from 2 minutes to 10 minutes to promote sufficient crystallization of the polymer blend of the pellets to provide Shore A hardness values sufficient to reduce or prevent agglomeration in subsequent handling and storage as discussed above.

The chilling accelerates the hardening so that Shore A hardness values of at least 50, 60, and 65 may be achieved in first, second, and third embodiments, in the time before the pellets are collected for bagging or bailing in the continuous process. The progress of hardening is illustrated by reference to FIG. 4 which plots the increase in hardness in polymer blend strands after a period of chilling for 30 seconds in water maintained at a temperature of about 2° C.

In the spin drier 88 the bulk of the water is removed. The dried pellets are conveyed to a vibrating fluidized bed drier 90. Warm, dry air dries the pellets and removes surface water. The pellets are then conveyed, if necessary, to a duster 92 to be dusted with an anti-agglomeration agent, as described in more detail hereinafter. Finally the dusted pellets are conveyed to a packaging station to produce finished polymer blend pellets 94.

When using a shared recycle and separation system for solvent and reactor, a residual amount of ethylene may be recycled to one or more of the reactors producing the polymeric component to reduce the crystallinity of the polymer being produced. Alternatively, to increase the crystallinity of polymeric components used in the polymer blends, purified solvent and/or propylene may be supplied to one or more of the reactors producing the polymeric components to produce a more crystalline polymeric component for use in the polymer blend. Propylene from the recycle stream may be purified to remove substantially all of the ethylene in it to produce a homopolymer.

Dusting Polymer Pellets

Pellets produced from the polymer blends described herein may be "dusted" with an anti-stick agent to help reduce agglomeration. An anti-stick agent is typically a powder. Exemplary anti-stick agents of are selected from waxes, polyethylenes, polypropylenes, talc, calcium stearate, and mixtures thereof. The anti-stick agent level will generally range from about 100 parts per million ("ppm") to about 8,000 ppm, based on the weight of the polymer blend. In certain embodiments, the anti-stick agent will be present in the range of about 500 ppm to about 7,000 ppm. In other embodiments, the anti-stick agent will be present in the range of from about 1,000 ppm to about 5,000 ppm. In still other embodiments, the range is from about 1,000 ppm to about 4,000 ppm.

Experimental Evaluations

As discussed above, it has been discovered that blending the LCPC and the HCPC while in solution in streams from series and parallel reactors produces an intimate blending of the polymeric components. The following Table I A sets forth the process conditions for producing certain exemplary polymer blends in two series reactors in which a LCPC is produced in the first reactor in the series and a HCPC is produced in the second reactor in the series. In this group of experiments, the first reactor in the series was used to produce 88 wt. % to 92 wt. % of a blend that is an LCPC and the second reactor in the series was used to produce 8 wt. % to 12 wt. % of a polymeric blend that is a HCPC.

TABLE I A

| Run | R1 Rx Temp (° C.) | R2 Rx Temp (° C.) | LCPC (%) in R1 | R1 Reactor ethylene (wt %) | R2 Reactor ethylene (wt %) | Pellet ethylene (wt %) | R2 Calc ethylene (wt %) | Irg-1076 (wt %) | R1 MFR (230 C, 2 Kg) | Pellet MFR (230 C, 2 Kg, g/10') | R1 C2 Conv (%) | R1 C3 Conv (%) | Tot C2 Conv (%) | Tot C3 Conv (%) |
|---|---|---|---|---|---|---|---|---|---|---|---|---|---|---|
| 1 | 85.0 | 80.0 | 88.3 | 16.42 | 15.29 | 15.31 | 6.76% | 0.017 | 15.86 | 18.11 | 79.1 | 38.9 | 82.7 | 39.6 |
| 2 | 87.1 | 79.7 | 90.45 | 17.1 | 15.68 | 15.39 | 2.23% | 0.024 | 20.44 | 17.7 | 85.0 | 41.3 | 86.9 | 41.0 |
| 3 | 85.1 | 78.7 | 88.70 | 14.82 | 15.30 | 14.55 | 19.07% | 0.029 | 19.74 | 16.19 | 82.12 | 39.22 | 85.65 | 39.8 |
| 4 | 84.8 | 77.3 | 89.59 | 14.98 | 14.35 | 14.26 | 8.93% | 0.032 | 16.88 | 17.85 | 82.47 | 39.38 | 85.09 | 39.5 |
| 5 | 84.6 | 70.7 | 91.9 | 15.93 | 15.17 | 15.75 | 6.51% | 0.033 | 25.27 | 15.06 | 82.66 | 40.15 | 86.92 | 41.1 |

Table I B provides various physical properties and compositions for the polymer blends listed in Table I A and pellets produced from the blends. The data demonstrates that when high proportions of the LCPC are produced in the first of the series reactors, it is difficult to precisely control the composition of the HCPC produced in the second series reactor. The difficulty arises from the presence of residual commoner in the effluent transferred from the first reactor to the second reactor that may be incorporated into the HCPC produced in the second reactor. For more information regarding this issue, see FIG. 7 and the accompanying discussion.

TABLE IB

90:10 Series Reactor Blend Properties

| ID | Units | 1 | 2 | 3 | 4 | 5 | Comparative Physical Blend (10%) |
|---|---|---|---|---|---|---|---|
| Modulus at 100% Elongation | MPa | 1.6 | 1.7 | 2 | 2 | 1.7 | 2.3 |
| Modulus at 300% Elongation | MPa | 2 | 2.1 | 2.4 | 2.4 | 2.1 | 3.2 |
| Tensile Strength @ Max Strain | MPa | 7.5 | 7.7 | 8.8 | 8.6 | 8.1 | 10.0 |
| Energy @ Max Strain | Ft-lbf | 31.1 | 32.5 | 36.5 | 37 | 33.2 | |
| Flex Modulus 1% Secant | psi | 2086 | 2156 | 2257 | 2558 | 2389 | 2700 |
| ViCat Softening Temperature | C | 47.3 | 47.8 | 49.8 | 50.4 | 48.2 | 46 |
| DSC 1$^{st}$ Melt Peak Temp | C | 45.1 | 45.6 | 45.91 | 45.6 | 45.6 | 44.9 |

TABLE IB-continued

90:10 Series Reactor Blend Properties

| ID | Units | 1 | 2 | 3 | 4 | 5 | Comparative Physical Blend (10%) |
|---|---|---|---|---|---|---|---|
| DSC $1^{st}$ Melt Heat of Fusion ΔH | J/g | 13.2 | 14 | 14.9 | 16.5 | 14.5 | 18.6 |
| DSC $2^{nd}$ Melt Peak Temp | C | na | na | 58.7 | 58.4 | 59.6 | 37.4 |
| DSC $2^{nd}$ Melt Maximum Temp | C | na | na | 78 | 82 | 63 | 170 |
| DSC $2^{nd}$ Melt Heat of Fusion ΔH | J/g | na | na | 5.3 | 5.6 | 0.6 | 11.7 |
| DSC Glass Transition Tg | C | −30.2 | −29.2 | −28.2 | −28.8 | −30.1 | −28.1 |
| GPC Mn DRI | g/mole | 75137 | 74316 | 75878 | 71395 | 79853 | 69421 |
| GPC Mw DRI | g/mole | 143970 | 139875 | 142054 | 139669 | 143526 | 132349 |
| GPC Mn 3D | g/mole | 83098 | 83043 | 85671 | 78832 | 87877 | 81042 |
| GPC Mw 3D | g/mole | 151472 | 147108 | 151156 | 144564 | 150891 | 141526 |
| GPC Mz 3D | g/mole | 227293 | 218865 | 226022 | 218699 | 222749 | 228443 |
| Mw/Mn (3D/DRI) | | 2.02 | 1.98 | 1.99 | 2.02 | 1.89 | 2.04 |
| Mz/Mw (3D/3D) | | 1.50 | 1.49 | 1.50 | 1.51 | 1.48 | 1.61 |
| Density ASTM (7 day) | g/cc | 0.8613 | 0.8614 | 0.8628 | 0.863 | 0.8613 | |
| LCPC Amount | % | 88.3 | 90.45 | 88.7 | 89.59 | 91.9 | 10 |
| Calc Ethylene Content of HCPC | wt % | 6.76 | 2.23 | 19.07 | 8.93 | 6.51 | 0 |
| Ethylene Content of LCPC | wt % | 16.42 | 17.1 | 14.82 | 14.98 | 15.93 | 15 |
| LCPC Melt Flow Rate (230 C, 2 Kg) | g/10 min | 15.86 | 20.44 | 19.74 | 16.88 | 25.27 | 22 |
| Pellet Melt Flow Rate (230 C, 2 Kg) | g/10 min | 18.11 | 17.7 | 16.19 | 20.35 | 15.06 | 18 |

The following Table II A sets forth the process conditions for producing certain exemplary polymer blends in two series reactors in which 5 wt. % to 11 wt. % of a HCPC blend component is produced in the first reactor in the series and 89 wt. % to 95 wt. % of a LCPC blend component is produced in the second reactor in the series.

TABLE II A

| Run | R1 Rx Temp (°C.) | R2 Rx Temp (°C.) | HCPC (%) in R1 | R1 Reactor ethylene (wt %) | R2 Reactor ethylene (wt %) | Pellet ethylene (wt %) | Calc R2 ethylene (wt %) | Irg-1076 (wt %) | R1 MFR (230 C, 2 Kg) | R2 MFR (230 C, 2 Kg) | Pellet MFR (230 C, 2 Kg, g/10') | R1 C2 Conv (%) | R1 C3 Conv (%) | Tot C2 Conv (%) | Tot C3 Conv (%) |
|---|---|---|---|---|---|---|---|---|---|---|---|---|---|---|---|
| 6 | 69.0 | 86.1 | 5.97 | 4.73 | 15.04 | 16.55 | 15.69% | 0.043 | 28.23 | 16.85 | 18.40 | 100 | 49.11 | 85.0 | 41.3 |
| 7 | 70.7 | 86.5 | 6.66 | 3.41 | 15.49 | 16.43 | 16.35% | 0.044 | 37.32 | 22.64 | 17.28 | 100 | 70.72 | 91.25 | 44.4 |
| 8 | 65.6 | 87.8 | 5.24 | 6.13 | 16.56 | 16.57 | 17.14% | 0.037 | 31.02 | 21.64 | 18.34 | 95.4 | 41.92 | 81.23 | 39.5 |
| 9 | 65.3 | 87.7 | 5.07 | 6.05 | 14.84 | 16.24 | 15.31% | 0.024 | 20.14 | 28.44 | 15.35 | 94.0 | 41.1 | 82.37 | 36.9 |
| 10 | 64.5 | 87.4 | 11.21 | 3.00 | 14.42 | 15.24 | 15.86% | 0.028 | 23.19 | 21.34 | 17.67 | 100 | 48.25 | 92.1 | 42.3 |

Table II B provides various physical properties and compositions for the polymer blends listed in Table II A and pellets produced from the blends.

TABLE II B

5:95 and 10.90 Series Reactor Blend Properties

| ID | Units | 6 | 7 | 8 | 9 | 10 | Comparative Physical Blend (5%) | Comparative Physical Blend (10%) |
|---|---|---|---|---|---|---|---|---|
| Modulus at 100% Elongation | MPa | 1.5 | 1.3 | 1.4 | 1.4 | 1.9 | 2.0 | 2.3 |
| Modulus at 300% Elongation | MPa | 1.9 | 1.6 | 1.8 | 1.8 | 2.3 | 2.6 | 3.2 |
| Tensile Strength @ Max Strain | MPa | 6.5 | 6.3 | 6.1 | 5.9 | 7.1 | 9.7 | 10.0 |
| Energy @ Max Strain | Ft-lbf | 28.6 | 23.2 | 26.7 | 26.8 | 33.2 | | |
| Flex Modulus 1% Secant | psi | 1751 | 1258 | 1356 | 1460 | 1650 | 1960 | 2700 |
| ViCat Softening Temperature | C | 46.1 | 44.1 | 46.4 | 45.4 | 58.1 | 47 | 46 |
| DSC $1^{st}$ Melt Peak Temp | C | 42.9 | 42.7 | 43.9 | 43.4 | 43.1 | 44.9 | 44.9 |
| DSC $1^{st}$ Melt Heat of Fusion ΔH | J/g | 17.1 | 21.4 | 16.9 | 10.2 | 14.3 | 13.2 | 18.6 |
| DSC $2^{nd}$ Melt Peak Temp | C | 113.0 | 115.5 | 106.8 | 112.1 | 117.6 | 40.5 | 37.4 |
| DSC $2^{nd}$ Melt Heat of Fusion ΔH | J/g | 1.6 | 2.6 | 2.1 | 1.3 | 4.5 | 6.1 | 11.7 |
| DSC Glass Transition Tg | C | −30.1 | −31.2 | −30.9 | −30.1 | −30.1 | −29.3 | −28.1 |
| GPC Mn DRI | g/mole | 71104 | 71762 | 74385 | 69293 | 74702 | 69332 | 69421 |
| GPC Mw DRI | g/mole | 139985 | 140568 | 142235 | 143591 | 144135 | 132992 | 132349 |
| GPC Mn 3D | g/mole | 78699 | 78289 | 83622 | 80009 | 83769 | 79165 | 81042 |
| GPC Mw 3D | g/mole | 147006 | 146965 | 149233 | 150052 | 149929 | 136437 | 141526 |
| GPC Mz 3D | g/mole | 223254 | 222312 | 223874 | 225574 | 225755 | 204597 | 228443 |
| Mw/Mn (3D/DRI) | | 2.07 | 2.05 | 2.01 | 2.17 | 2.01 | 1.97 | 2.04 |
| Mz/Mw (3D/3D) | | 1.52 | 1.51 | 1.50 | 1.50 | 1.51 | 1.50 | 1.61 |
| Density ASTM (7 day) | g/cc | 0.861 | 0.8612 | 0.8602 | 0.8612 | 0.8636 | | |
| HCPC Amount | % | 5.97 | 6.66 | 5.24 | 5.07 | 11.21 | 5 | 10 |

TABLE II B-continued

5:95 and 10.90 Series Reactor Blend Properties

| ID | Units | 6 | 7 | 8 | 9 | 10 | Comparative Physical Blend (5%) | Comparative Physical Blend (10%) |
|---|---|---|---|---|---|---|---|---|
| Ethylene Content of HCPC | wt % | 4.73 | 3.41 | 6.13 | 6.05 | 3 | 0 | 0 |
| MFR of HCPC (230 C, 2 Kg) | g/10 min | 28.23 | 37.32 | 31.02 | 20.14 | 23.19 | | |
| Ethylene Content of LCPC | wt % | 15.69 | 16.35 | 17.14 | 15.31 | 15.86 | 15 | 15 |
| LCPC Melt Flow Rate (230 C, 2 Kg) | g/10 min | | | | | | 22 | 22 |
| Pellet Melt Flow Rate (230 C, 2 Kg) | g/10 min | 18.4 | 17.28 | 18.34 | 15.35 | 17.67 | 18 | 18 |

The following Table III A sets forth the process conditions for producing certain exemplary polymer blends in two parallel reactors in which 5 wt. % or 10 wt. % of a HCPC blend component is produced in the first parallel reactor and 90 wt. % or 95 wt. % of a LCPC blend component is produced in the second parallel reactor.

TABLE III A

| Run | R1 Rx Temp (° C.) | R2 Rx Temp (° C.) | HCPC (%) in R1 | R1 Reactor ethylene (wt %) | R2 Reactor ethylene (wt %) | Pellet ethylene (wt %) | R2 Calc ethylene (wt %) | Irg-1076 (wt %) | R1 MFR (230 C, 2 Kg) | R2 MFR (230 C, 2 Kg) | Pellet MFR (230 C, 2 Kg, g/10') | R1 C2 Conv (%) | R1 C3 Conv (%) | Tot C2 Conv (%) | Tot C3 Conv (%) |
|---|---|---|---|---|---|---|---|---|---|---|---|---|---|---|---|
| 11 | 63.8 | 91.6 | 4.7 | 4.23 | 14.51 | 14.66 | na | 0.048 | 14.87 | 20.91 | 18.07 | 60.61 | 37.13 | 82.47 | 36.75 |
| 12 | 66.7 | 90.6 | 4.93 | 3.84 | 15.29 | 14.24 | na | 0.046 | 20.49 | 17.66 | 19.55 | 53.84 | 38.01 | 83.62 | 35.46 |
| 13 | 68.4 | 88.6 | 4.82 | 3.9 | 15.23 | 14.92 | na | 0.037 | 5.05 | 14.65 | 18.5 | 48.17 | 26.46 | 84.68 | 36.01 |
| 14 | 62 | 91.1 | 5.19 | 5.76 | 15.77 | 14.72 | na | 0.034 | 6.41 | 21.37 | 21.43 | 46.64 | 29.08 | 84.58 | 36.41 |
| 15 | 73.6 | 87.5 | 10.12 | 6.16 | 15.66 | 14.43 | na | 0.052 | 14.58 | 17.05 | 21.37 | 51.06 | 32.35 | 83.18 | 34.81 |
| 16 | 68.4 | 88.9 | 10.12 | 5.36 | 15.43 | 14.8 | na | 0.05 | 11.46 | 19.53 | 18.72 | 51.06 | 32.35 | 83.18 | 34.81 |

Table III B provides various physical properties and compositions for the polymer blends listed in Table III A and pellets produced from the blends.

TABLE III B

5:95 and 10:90 Parallel Reactor Blend Properties

| ID | Units | 11 | 12 | 13 | 14 | 15 | 16 | Comparative Physical Blend (5%) | Comparative Physical Blend (10%) |
|---|---|---|---|---|---|---|---|---|---|
| Modulus at 100% Elongation | MPa | 2.1 | 2.1 | 2.2 | 2.1 | 2.4 | 2.5 | 2.0 | 2.3 |
| Modulus at 300% Elongation | MPa | 2.5 | 2.5 | 2.6 | 2.5 | 2.7 | 2.9 | 2.6 | 3.2 |
| Tensile Strength @ Max Strain | MPa | 8.9 | 8.9 | 9.3 | 9 | 9.3 | 9.6 | 9.7 | 10.0 |
| Energy @ Max Strain | Ft-lbf | 38.2 | 37.6 | 37.7 | 37.2 | 41.5 | 43.2 | | |
| Flex Modulus 1% Secant | psi | 2384 | 2364 | 2316 | 2389 | 2841 | 3033 | 1960 | 2700 |
| ViCat Softening Temperature | C | 51.3 | 52.1 | 54.0 | 52.9 | 59.7 | 60.2 | 47 | 46 |
| DSC 1st Melt Peak Temp | C | 42.7 | 42.7 | 42.9 | 43.9 | 42.7 | 43.2 | 44.9 | 44.9 |
| DSC 1st Melt Maximum Temp | C | 122.0 | 125.0 | 112.0 | 105.0 | 115.0 | 112.0 | 170 | 175 |
| DSC 1st Melt Heat of Fusion ΔH | J/g | 23.4 | 24.9 | 28.9 | 22.0 | 27.7 | 17.0 | 13.2 | 18.6 |
| DSC 2nd Melt Peak Temp | C | 45.4 | 45.0 | 52.8 | 52.9 | 67.4 | 52.9 | 40.5 | 37.4 |
| DSC 2nd Melt Heat of Fusion ΔH | J/g | 17.5 | 1.8 | 6.8 | 5.2 | 13.1 | 18.8 | 6.1 | 11.7 |
| DSC Glass Transition Tg | C | −28.9 | −29.2 | −29.2 | −28.5 | −28.8 | −29.6 | −29.3 | −28.1 |
| GPC Mn DRI | g/mole | 70850 | 71330 | 76148 | 70457 | 72942 | 76478 | 69332 | 89421 |
| GPC Mw DRI | g/mole | 143618 | 141634 | 150558 | 136606 | 151464 | 151406 | 132992 | 132349 |
| GPC Mn 3D | g/mole | 80368 | 81029 | 84012 | 78272 | 82185 | 90041 | 79165 | 81042 |
| GPC Mw 3D | g/mole | 149472 | 147359 | 156535 | 143677 | 155048 | 161182 | 136437 | 141526 |
| GPC Mz 3D | g/mole | 224444 | 221982 | 241406 | 221086 | 229840 | 246473 | 204597 | 228443 |

TABLE III B-continued

5:95 and 10:90 Parallel Reactor Blend Properties

| ID | Units | 11 | 12 | 13 | 14 | 15 | 16 | Comparative Physical Blend (5%) | Comparative Physical Blend (10%) |
|---|---|---|---|---|---|---|---|---|---|
| Mw/Mn (DRI/DRI) | | 2.03 | 1.99 | 1.98 | 1.94 | 2.08 | 1.98 | 1.92 | 1.91 |
| Mw/Mn (3D/DRI) | | 2.11 | 2.07 | 2.06 | 2.04 | 2.13 | 2.11 | 1.97 | 2.04 |
| Mz/Mw (3D/3D) | | 1.50 | 1.51 | 1.54 | 1.54 | 1.48 | 1.53 | 1.50 | 1.61 |
| Density ASTM (7 day) | g/cc | 0.864 | 0.864 | 0.8639 | 0.8639 | 0.8658 | 0.8663 | | |
| HCPC Amount | % | 4.7 | 4.93 | 4.82 | 5.19 | 10.12 | 10.12 | 5 | 10 |
| Ethylene Content of HCPC | wt % | 4.23 | 3.84 | 3.9 | 5.76 | 6.16 | 5.36 | 0 | 0 |
| MFR of HCPC (230 C, 2 Kg) | g/10 min | 14.9 | 20.49 | 5.05 | 6.41 | 14.58 | 11.46 | | |
| Ethylene Content of LCPC | wt % | 14.5 | 15.29 | 15.23 | 15.77 | 15.66 | 15.43 | 15 | 15 |
| LCPC Melt Flow Rate (230 C, 2 Kg) | g/10 min | 20.9 | 17.7 | 14.65 | 21.37 | 17.05 | 19.53 | 22 | 22 |
| Pellet Melt Flow Rate (230 C, 2 Kg) | g/10 min | 18.1 | 19.55 | 18.5 | 21.43 | 21.37 | 18.72 | 18 | 18 |

It was observed among the various methods of producing the polymer blends, parallel reactor production of the polymeric components provided the greatest control over the composition of the polymeric components. Of course, this should be expected given that the polymeric components were produced independently of each other. With respect to series reactor production of the polymeric components, production of the LCPC in the second reactor in the series provided the greatest control over the compositions of the polymeric components. When the LCPC was produced in the second reactor in the series, polymer blends incorporating up to 95 wt. % LCPC could be produced reliably and compositions and molecular weights of components were easily monitored.

Figure 3:
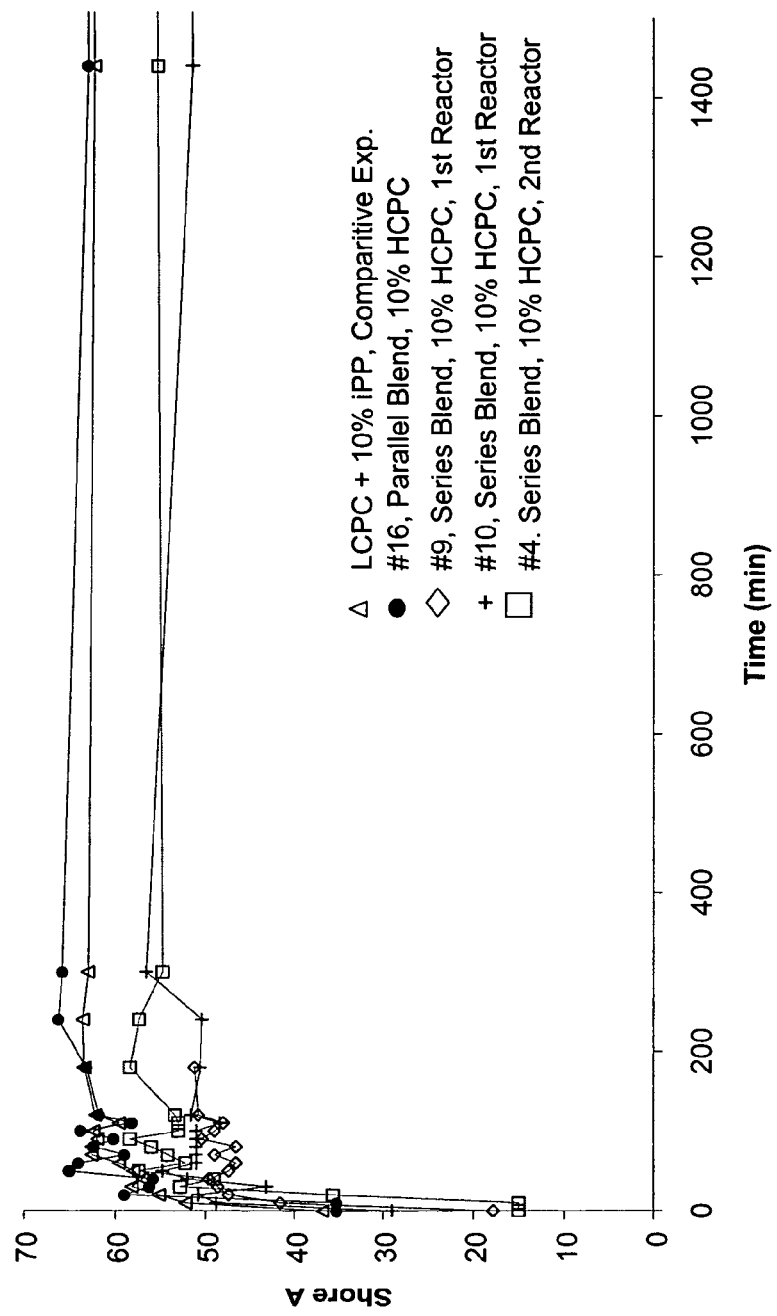
FIG. 3 is a plot of Shore A hardness values over time for pellets produced in accordance with processes described herein.

FIG. 3 plots Shore A hardness values over time for pellets produced in accordance with the processes in Tables I A, II A, and III A. FIG. 3 also includes Shore A hardness values over time for a comparative polymer blend in which the LCPC was physically blended with 10% isotactic PP. This physical blend is known to have good pellet stability and is used here as a benchmark to define a minimum required level of hardness to impart reasonable pellet stability in the reactor blends of this invention. The test samples for which data is presented in FIG. 3 were produced by pressing the polymer blends at 176.6° C. at a pressure of 137.8 MPa for 3 minutes to produce plaques 2 mm thick. The plaques were then quench cooled by plunging them into an ice-water bath for 30 to 60 seconds before measuring the initial Shore A value.

By reviewing the data presented in FIG. 3, it is seen that the plaques produced in the parallel reactor process configuration, as described herein, exhibit Shore A hardness properties equal to or greater that the Shore A hardness properties of the comparative physically blended plaques. Surprisingly, it has been found that the reactor blends made in series configuration do not become as hard as the reactor blends made in parallel reactor configuration or as hard as the comparative physical blends. In fact, even when given ample time to fully develop all the crystallinity expected, the series reactor blends never achieve Shore A hardness equivalent to the parallel reactor blends. Not wanting to be bound by theory, this may be due to an improved compatibility between the HCPC and the LCPC when produced in series reactor configurations. Reactor blends produced in parallel reactor configurations may make a HCPC that begins to crystallize before coming in contact with the LCPC or during the time it is in the presence of the LCPC and this may act as a nucleating agent to promote the crystallization of the LCPC.

However, in each of the exemplary reactor blend products, the initial Shore A values were at least 50 after cooling and thus were very similar to the comparative physical blend value. This improvement in hardness suggests that the HCPC enhances the development of crystallinity in the LCPC and thereby provides sufficient hardness to impart pellet stability. This is true for both the series reactor blend products and the parallel reactor blend products.

To better understand the development of Shore A hardness in the first few minutes, and to better mimic a typical commercial process, samples were prepared by extrusion of the exemplary reactor blends using a twin screw extruder, whereby the extrudate was quench cooled in an chilled bath set to a temperature of about 2° C. for 30 seconds, whereby the chilled strand was cut into 5 inch lengths before pelletization and the Shore A hardness of the extruded strand segment was measured immediately using a hand held Shore A durometer.

Figure 4:
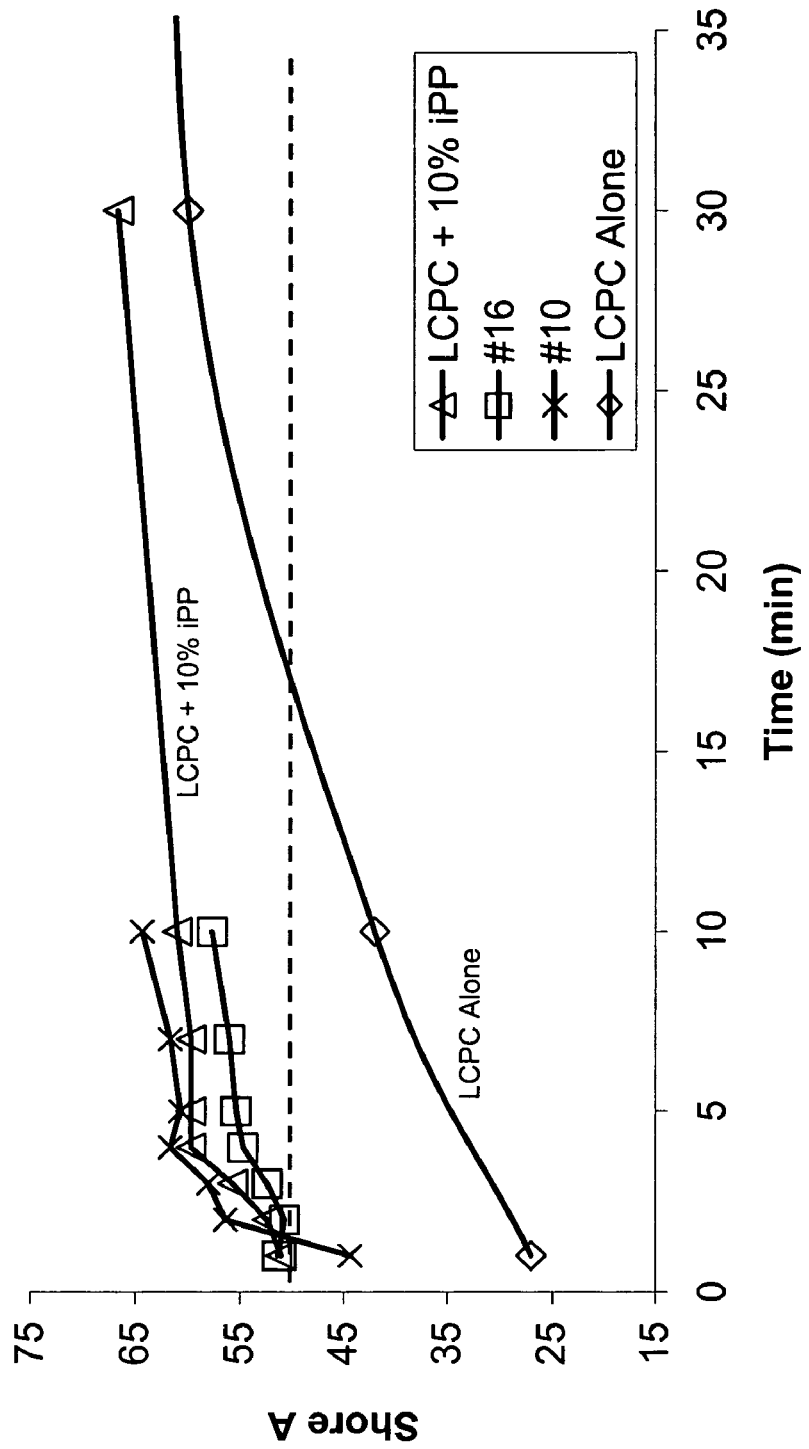
FIG. 4 is a plot of Shore A hardness values over time for extruded strands of polymer blends produced in accordance with processes descried herein.

FIG. 4 plots Shore A hardness values over time for extruded strands in accordance with the processes in Tables I A, II A and III A. Representative of a reactor blend product made in a parallel reactor configuration is sample #16 and representative of reactor a blend product made in a series reactor configuration is sample #10. In addition, FIG. 4 plots forth Shore A hardness values over time for the extruded strand of the LCPC alone as well as a comparative physical blend of LCPC and 10% by weight of iPP. Like the physical blend of the LCPC and iPP, all the reactor blend samples made from both the parallel reactor configuration and the series reactor configuration develop a Shore A hardness of at least 50 after cooling. In contrast, the extruded strand produced from LCPC alone exhibited an initial Shore A hardness of less that 30. Almost 20 minutes elapsed during air cooling at 23 C before the LCPC achieved a Shore A hardness value of at least 50.

In one embodiment, the pellets emerging after devolatilization and cutting are chilled to accelerate their hardening and resistance against permanent deformation after compression, such as when packed in a bag, a box or a supersack. FIG. 3 and FIG. 4 demonstrate that the hardening effect is pronounced especially when the LCPC and the HCPC are made in parallel reactors and hybrid polymer species, such as those possibly made partly in the first polymerization reactor and then incorporated partly in the second polymerization reactor of a series reactor configuration, are absent.

An intimate mixture, at a molecular level, of the first and second polymer is obtained during mixing from solution. After devolatilization, when the solvent has been removed, the blended LCPC and HCPC polymer components remain intimately mixed and can be pelletized of otherwise finished as an intimate blend. Rapid chilling of the polymeric blend pellets may assist in preserving that intimate mixture and deferring the formation of dispersed occlusions of crystallized HCPC, as the second polymer, in a matrix formed by the more elastomeric LCPC as the first polymer.

Figure 5:
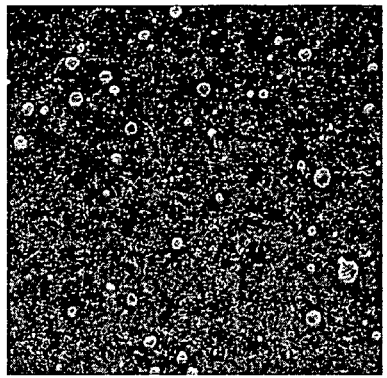
FIG. 5 provides atomic force micrographs of pellets of various polymer blends.
Figure 5:
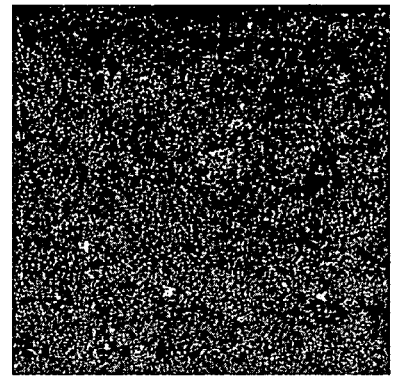
Figure 5:
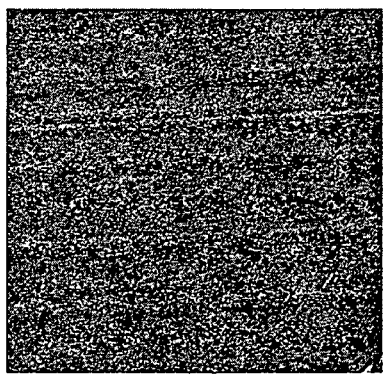

The phase morphology of the polymer blends may be distinguished by using atomic force microscopy, which measures the modulus of a material, and can produce an image by contrasting changes in the modulus. FIG. 5A illustrates an atomic force micrograph of a cross-section of a pellet of the comparative physical blend sample produced by this rapid chilling procedure. As one can see from the lack of features in the micrograph, the two components of the blend look miscible, or are so finely dispersed that distinction between the two phases can not be made. FIG. 5B, on the other hand, shows clearly the phase separated product obtained using the same material heated (annealed) to a temperature of 180° C. for 15 minutes. In this example the lighter islands of material are pockets of iPP that have agglomerated in the matrix of the darker LCPC.

FIG. 5C shows a representative series reactor blend product and FIG. 5D shows a representative parallel reactor blend product annealed under identical conditions. These reactor blends do not show the clear phase separation seen previously and it is clear that the HCPC in the reactor blends is somewhat more compatible with the LCPC than the iPP of the comparative physical blend. However, whereas the series reactor blend product is completely featureless, the parallel reactor blend product looks somewhat more grainy and this may be indicative of a very fine dispersion of phase separated domains of the HCPC. If the HCPC of the parallel reactor blends are less compatible they may provide a better surface nucleation site and thereby promote crystal growth and hardness in the parallel reactor blends relative to the series reactor blends.

Figure 6:
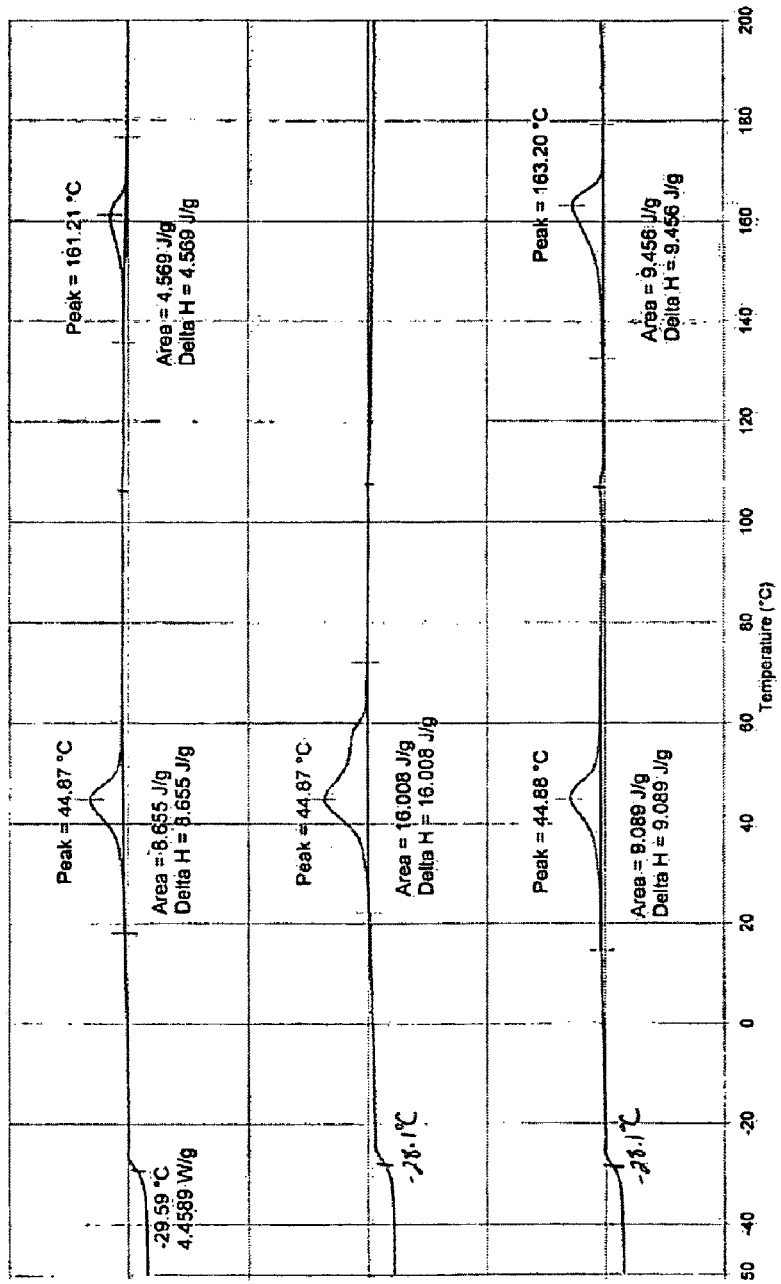
FIG. 6 plots Differential Scanning calorimetry (DSC) curves of various physical polymeric blends.
Figure 7:
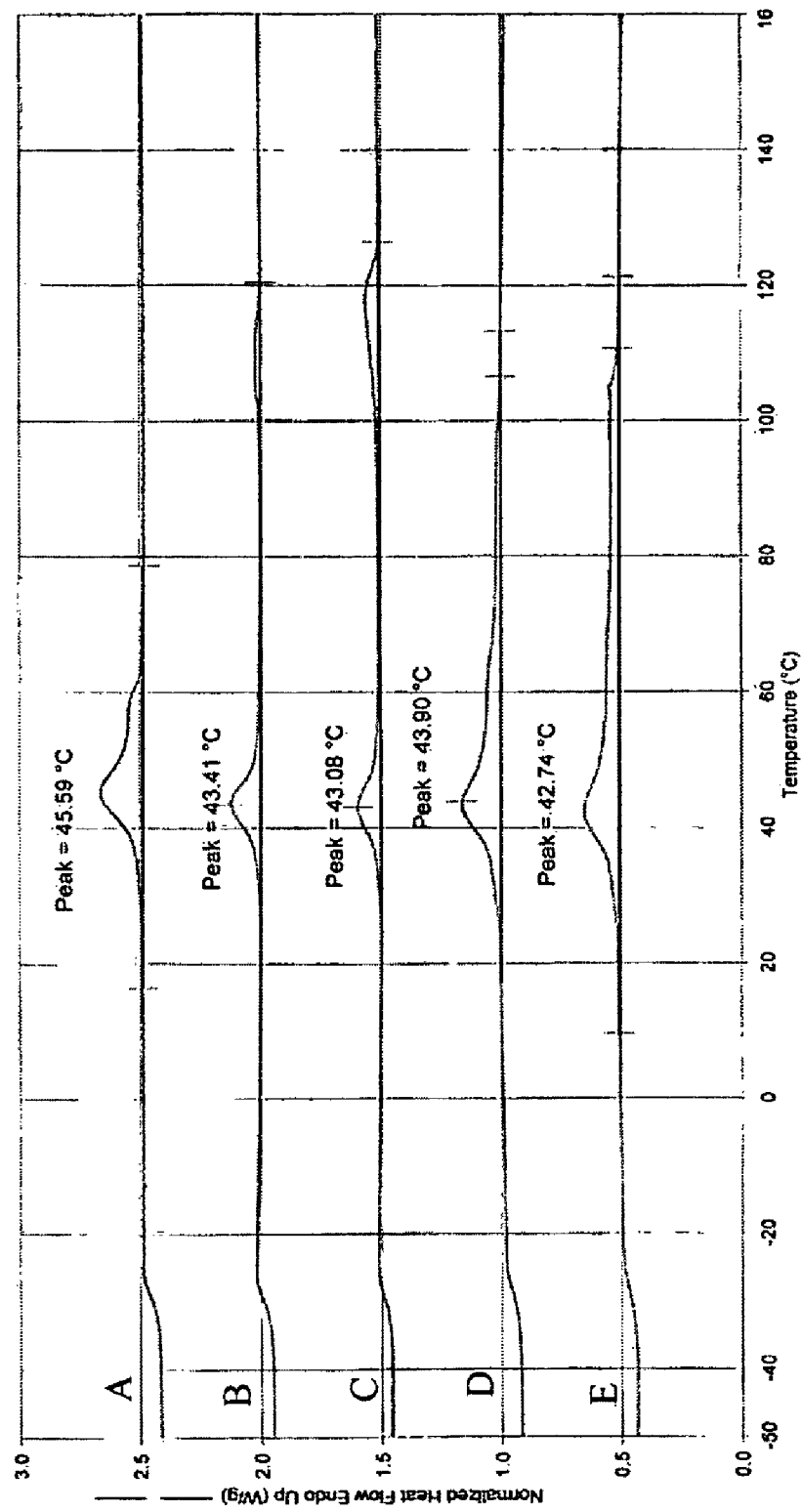
FIG. 7 plots Differential Scanning calorimetry (DSC) curves of various reactor polymeric blends.

Other effects may occur as a result of the devolatilization and pellet hardening conditions employed. FIG. 6 and FIG. 7 plot the Differential Scanning calorimetry (DSC) curves of certain polymeric blends described herein. The single Tg seen in these blends is lower than that which would be expected for the HCPC alone and is associated with the LCPC. This applies to both physically blended materials as will as materials made in dual series and parallel reactor schemes as described herein. As to the melting behavior, the DSC curves indicate that the distinct high melting point of the HCPC is preserved in physical blends that are not produced in accordance with the processes described herein.

FIG. 6 provides DSC curves of the comparative blends produced by physically blending a LCPC and isotactic polypropylene. The top curve represents a polymer blend produced by physically blending 95 wt. % of a LCPC and 5 wt. % of a HCPC where the HCPC is isotactic polypropylene. The glass transition temperature associated with the LCPC is clearly seen around −29.6° C., the Tm of the LCPC is seen around 45° C. and the Tm of the HCPC is seen around 161° C.

The middle curve represents the LCPC in neat form.

The bottom curve represents a blend produced by physically blending a LCPC and 10 wt. % of a HCPC where the HCPC is isotactic polypropylene. The glass transition temperature associated with the LCPC is clearly seen around −28.5° C., the Tm of the LCPC is seen around 45° C. and the Tm of the HCPC is seen around 163° C.

FIG. 7 provides DSC curves of polymer blends produced in reactors as described herein. Polymer blends produced in the series reactor configuration as described herein where the HCPC is made in the second reactor do not have a clearly defined melt temperatures associated with the HCPC due to the residual comonomer, as discussed previously, see curve 7A. However, blends in series reactor configuration as described herein where the HCPC is made in the first reactor have clearly defined melting temperatures associated with the HCPC, see curves 7B and 7C. These temperatures have shifted to lower values relative to the comparative physical blends as expected for HCPC containing some comonomer. Products made in parallel reactor configurations as described herein have melting transitions that are better dispersed over a broad range of temperatures and, as a result, the peak temperature associated with the HCPC is less defined, but it is believed that the unique form of admixture of the parallel reactor product may be the reason why the product shows a superior performance in terms of hardening after chilling, which in turn results in improved pellet stability.

Curve 7A is example #1, a series reactor blend where 90 wt. % of the blend is LCPC made in the first reactor and 10 wt. % of the blend is made in the second reactor. Residual comonomer from the first reactor caused the HCPC to get washed out in this reactor configuration. The heat of melting is 14.5 J/g.

Curve 7B is example #9, a series reactor blend where 5 wt. % of the blend is HCPC made in the first reactor and 95 wt. % of the blend is LCPC made in the second reactor. A small melting transition associated with the HCPC is evident around 115° C. The heat of melting is 10.2 J/g.

Curve 7C is example #10, a series reactor blend where 10 wt. % of the blend is HCPC made in the first reactor and 90 wt. % of the blend is LCPC made in the second reactor. A larger melting transition associated with the HCPC is seen around 120° C. The heat of melting is 14.3 J/g.

Curve 7D is example #14, a parallel reactor blend where 95 wt. % of the blend is LCPC made in one reactor and 5 wt. % of the blend is HCPC made in the other reactor. The heat of melting is 22.0 J/g.

Curve 7E is example #15, a parallel reactor blend where 90 wt. % of the blend is LCPC made in one reactor and 10 wt. % of the blend is HCPC made in the other reactor. The heat of melting is 27.7 J/g.

Accordingly, rather than a sharp "peak" melt transition associated with the HCPC, the parallel reactor blends have a more dispersed distribution of crystallites that melt over a continuous broader range of temperatures.

Figure 8:
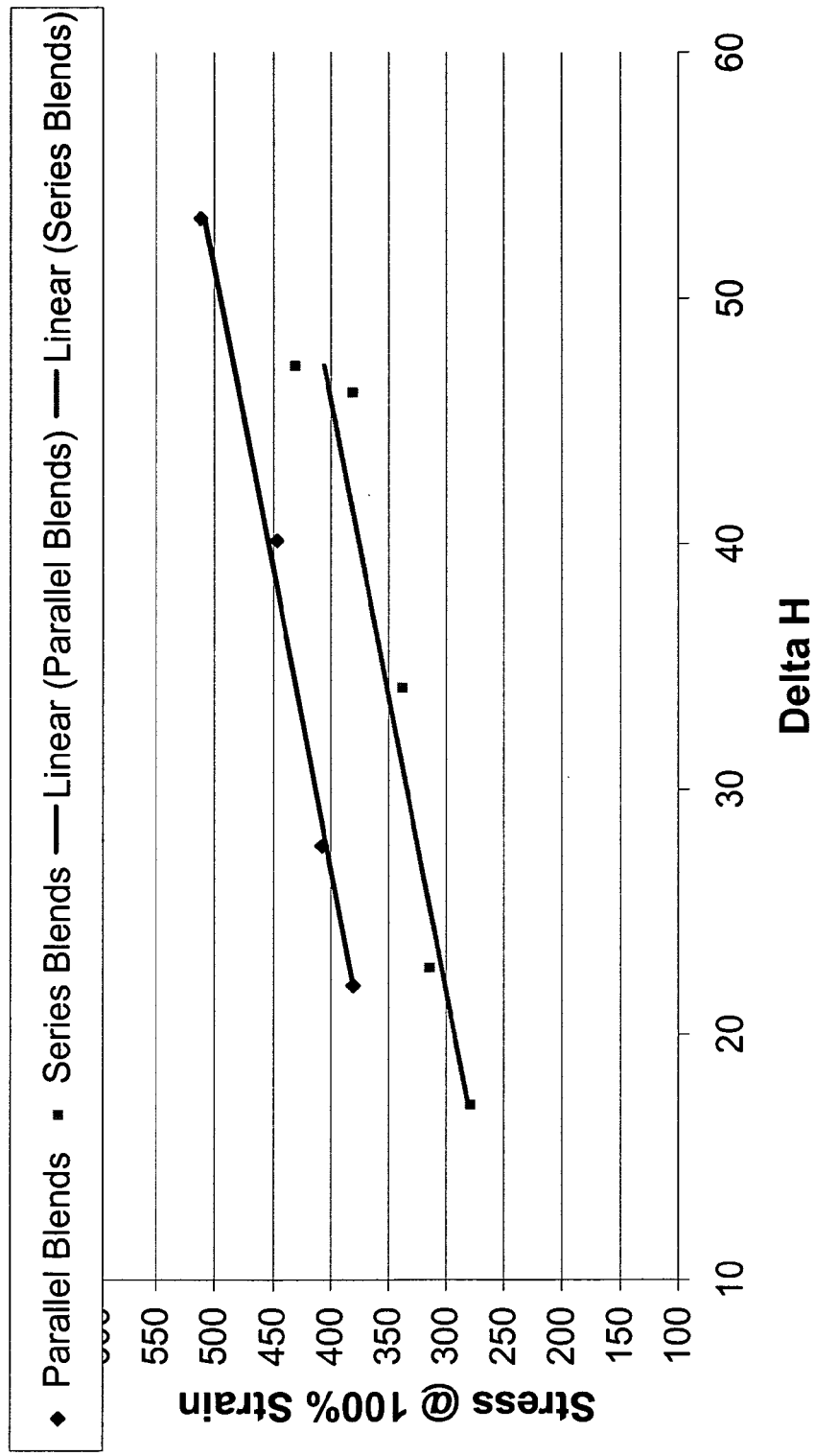
FIG. 8 plots stress vs. crystallinity (Delta H) of various polymer blends made under various process conditions.

To demonstrate the enhanced strength at a given level of crystallinity of the parallel reactor blends, the stress at 100% strain was plotted as a function of the total crystallinity as measured by the heat of melting (ΔH) from the DSC. FIG. 8 displays the results comparing parallel reactor blends and series reactor blends. The parallel reactor blends show a linear relationship over a range of crystallinity that is significantly higher than the values seen for series reactor blends. This data surprisingly suggests that the parallel reactor process promotes crystallite formation. Thus in applications where strength is important and permanent set can be sacrificed, a parallel reactor process has unique advantages. In applications where elasticity is an important attribute, a series reactor process has unique advantages.

Figure 9:
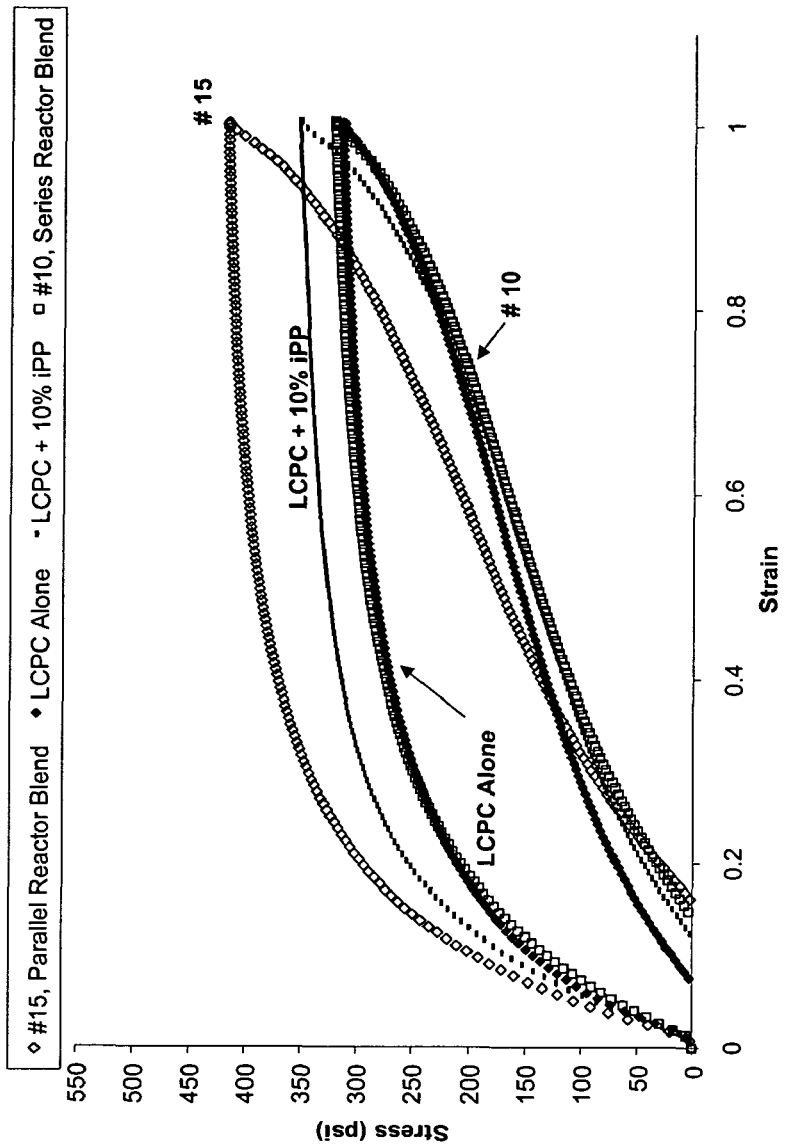
FIG. 9 plots stress strain curves of various polymer blends.

The uniqueness of parallel reactor produced blends is also highlighted by the stress-strain behavior of the blends as shown in FIG. 9. Representative examples of both the parallel reactor and the series reactor blends are compared to the physical blends and to the LCPC alone. The parallel reactor blends show a higher initial stress or resistance to extension and a higher overall stress at any given strain relative to the series reactor blends and the physical blends. This is due in part to the higher level of overall crystallinity found in the parallel reactor blends compared to the series reactor blends at similar composition and to the physical blends at similar composition.

Determining Agglomeration

As discussed above, pellets produced from the polymeric compositions provided herein exhibit reduced agglomeration tendencies as compared to pellets produced from conventional polymeric compositions. One method of measuring the reduced tendency to agglomerate is to fill a cone-shape container having a diameter of 7.62 cm at the top, a diameter at the bottom of 2.54 cm and a volume sufficient to hold 500 grams of polymer pellets, with polymer pellets of consistent size. The pellets should be of consistent size and weigh between 1 and 2 g per 50 pellets. The narrow end of the cylinder is sealed with a sliding gate valve and the cylinder is filled with 500 g of pellets. The assembly is placed in an oven set to 50° C. for 7 days. Thereafter the cylinder is removed, the gate valve opened quickly, and the time required for the pellets to flow out is recorded. After 5 minutes, and if necessary, the pellet container is probed to initiate pellet flow. If flow starts after the probe, the time required to empty the container is recorded. If the pellets do not flow after probing, the test is discontinued. Generally, if the polymer pellets flow out of the container in 60 seconds or less when using this test method, the polymer pellets are considered to be free-flowing and not affected by agglomeration. However, time periods of more than 5 minutes are considered failures.

To verify the agglomeration test, fiber drums containing up to 90 Kg of pellets of examples number 10, 12 and 16 were sealed and stored in a warehouse in Houston, Tex. over the summer months of July, August and September in 2004. These samples were then opened and the pellets were found to be free-flowing and could be poured from one container to another without aid.

It has been determined that the polymeric compositions described herein provide polymer pellets that when provided with anti-stick dusting exhibit agglomeration properties familiar to those of much higher density polymers.

Surprisingly, the processes described herein allow for the production, storage, and use of pellets of polymer blends that would typically be produced and shipped in bales because of agglomeration tendencies. Handling and use of polymer pellets provides significant cost savings as compared to handling and use of polymer bales. As demonstrated herein, these beneficial results may be achieved with surprisingly low concentrations of the HCPC in the polymeric blends.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims.

We claim:
1. A process for the production of a polymer blend comprising:
 (i) a first polymerization stage comprising polymerizing a first polymer comprising propylene-derived units in a first reactor to produce a solution of the first polymer comprising propylene-derived units, wherein the first polymer comprising propylene-derived units comprises at least 75 wt. % of propylene-derived units and wherein the propylene-derived units have an isotactic triad fraction of about 65% to about 99% and wherein the first polymer comprising propylene-derived units has a heat of fusion of less than 75 J/g;
 (ii) a second polymerization stage comprising polymerizing a second polymer comprising propylene-derived units in a second reactor to produce a solution of the second polymer comprising propylene derived units, wherein the second polymer comprising propylene-derived-units comprises at least 90 wt. % of propylene derived units and wherein the second polymer comprising propylene-derived units has a melting temperature of at least 100° C.;
 (iii) combining the solution of the first polymer comprising propylene-derived units and the solution of the second polymer comprising propylene-derived units after polymerization to produce a polymer blend solution comprising at least one non-polymeric component; and
 (iv) processing the polymer blend solution to produce the polymer blend.

2. The process of claim 1 wherein the polymer blend comprises from about 70 wt. % to about 98 wt. % of the first polymer comprising propylene-derived units and from about 2 wt. % to about 30 wt. % of the first polymer comprising propylene-derived units.

3. The process of claim 2 wherein the polymer blend has a Shore A hardness of at least 50.

4. The process of claim 3 wherein the first polymer comprising propylene-derived units comprises at from about 5 wt. % to about 25 wt. % of ethylene-derived units.

5. The process of claim 4 wherein the first polymer comprising propylene-derived units comprises from about 75 wt. % to about 95 wt. % propylene-derived units and from about 5 wt. % to about 20 wt. % ethylene-derived units.

6. The process of claim 5 wherein the step of processing the polymer blend solution to produce the polymer blend comprises subjecting the polymer blend solution to conditions of reduced pressure to remove at least a portion of the at least one non-polymeric component.

7. The process of claim 1 wherein the step of processing the polymer blend solution to produce the polymer blend comprises cooling the polymer blend in a water solution at a temperature of about 0° C. to about 10° C. to produce a Shore A hardness for the polymer blend of at least 50.

8. The process of claim 5 wherein the solution of the first polymer comprising propylene-derived units and the solution of the second polymer comprising propylene-derived units are combined by removing an effluent stream from the second reactor comprising the solution of the second polymer comprising propylene-derived units and directing the effluent stream from the second reactor to the first reactor, during the polymerization of the first polymer comprising propylene-derived units.

9. The process of claim 8 wherein the step of processing the polymer blend solution to produce the polymer blend comprises subjecting the polymer blend solution to conditions of reduced pressure to remove at least a portion of the at least one non-polymeric component.

10. The process of claim 8 wherein the step of processing the polymer blend solution to produce the polymer blend comprises cooling the polymer blend in a water solution at a temperature or about 0° C. to about 10° C. to produce a Shore A hardness for the polymer blend of at least 50.

11. The process of claim 5 wherein the solution of the first polymer comprising propylene-derived units and the solution of the second polymer comprising propylene-derived units are combined by removing a first effluent stream from the first reactor comprising at least a portion of the solution of the first polymer comprising propylene-derived units and removing a second effluent stream from the second reactor comprising at least a portion of the solution of the second polymer comprising propylene-derived units and mixing at least a portion of the first effluent stream and at least a portion of the second effluent stream.

12. The process of claim 11 wherein the step of processing the polymer blend solution to produce the polymer blend comprises providing a coating on the surface of the polymer pellets comprising a material selected from the group consisting of a wax, a polyethylene, a polypropylene, talc, calcium stearate, and mixtures thereof, wherein the material in the coating is present in amount from about 100 parts per million to about 8000 parts per million based upon the weight of the polymer pellet.

13. A continuous process for the production of non-agglomerating elastomeric pellets comprising:
   (i) continuously polymerizing a predominant amount based on the total polymer content in a first solution of a first polymer comprising at least 75 wt. % of propylene-derived units with an isotactic triad fraction of 65% to 99%, and a heat of fusion of less than 75 J/g;
   (ii) continuously polymerizing a minor amount based on the total polymer content in a second solution of a second polymer comprising at least 90 wt. % of propylene derived units having a melting temperature of at least 100° C.;
   (iii) continuously combining the first and second solutions after polymerization;
   (iv) devolatilizing the combined solutions; and
   (v) extruding the devolatilized polymer into pellets.

14. Process according to claim 13 in which the first polymer comprises at least 5 wt. % of ethylene-derived units and has a heat of fusion, when extracted and devolatilized separately, of less than 40 J/g.

15. Process according to claim 14 in which the first polymer comprises at least 12 wt. % of ethylene-derived units.

16. Process according to claim 13 in which the first polymer comprises from 75 wt. % to 95 wt. % of the total polymer.

17. Process according to claim 13 in which the second polymer has a melting point of at least 120° C. when extracted and devolatilized separately from the first polymer.

18. Process of claim 17 wherein the second polymer has a content of ethylene or alpha olefin from 4 to 10 carbon atoms of less than 10 wt. %.

19. Process according to claim 13 in which the devolatilized mixture has a single Tg as determined by DSC.

20. Process according to claim 13 in which the devolatilized mixture is produced under conditions of reduced pressure.

21. Process according to claim 13 in which the devolatilized mixture has a Shore A hardness of at least 50.

22. Process according to claim 13 in which the first and second polymer are combined in a parallel flow arrangement after separate polymerization and downstream combination of the first and second solution.

23. Process according to claim 13 in which the pellets are mixed in chilling fluid with an anti-stick agent at a concentration of 500 ppm to 7,000 ppm of the anti-stick agent, based on the weight of dry pellets.

* * * * *